US010853199B2

(12) United States Patent
Paley et al.

(10) Patent No.: US 10,853,199 B2
(45) Date of Patent: Dec. 1, 2020

(54) TECHNIQUES FOR MANAGING CONTEXT INFORMATION FOR A STORAGE DEVICE WHILE MAINTAINING RESPONSIVENESS

(71) Applicant: Apple Inc., Cupertino, CA (US)

(72) Inventors: Alexander Paley, San Jose, CA (US); Andrew W. Vogan, Cupertino, CA (US); Tudor Antoniu, Woodland, CA (US)

(73) Assignee: Apple Inc., Cupertino, CA (US)

( * ) Notice: Subject to any disclaimer, the term of this patent is extended or adjusted under 35 U.S.C. 154(b) by 99 days.

(21) Appl. No.: 16/136,189

(22) Filed: Sep. 19, 2018

(65) Prior Publication Data

US 2020/0089580 A1  Mar. 19, 2020

(51) Int. Cl.
G06F 11/14 (2006.01)
G06F 11/10 (2006.01)
G06F 12/02 (2006.01)

(52) U.S. Cl.
CPC ...... *G06F 11/1471* (2013.01); *G06F 11/1008* (2013.01); *G06F 11/1417* (2013.01); *G06F 11/1441* (2013.01); *G06F 11/1469* (2013.01); *G06F 11/1474* (2013.01); *G06F 12/0246* (2013.01); *G06F 2212/7201* (2013.01); *G06F 2212/7207* (2013.01)

(58) Field of Classification Search
CPC combination set(s) only.
See application file for complete search history.

(56) References Cited

U.S. PATENT DOCUMENTS

| | | | | |
|---|---|---|---|---|
| 9,158,779 | B2* | 10/2015 | Sudhakar | G06F 16/10 |
| 9,542,396 | B1* | 1/2017 | Pawar | G06F 11/1471 |
| 2009/0327589 | A1* | 12/2009 | Moshayedi | G06F 11/1441 |
| | | | | 711/103 |
| 2015/0355704 | A1* | 12/2015 | Grimsrud | G06F 1/3287 |
| | | | | 713/323 |
| 2019/0033951 | A1* | 1/2019 | Vui | G06F 1/3225 |
| 2019/0102101 | A1* | 4/2019 | Paley | G06F 3/068 |
| 2019/0190784 | A1* | 6/2019 | Shimojou | H04M 3/00 |

\* cited by examiner

*Primary Examiner* — Raymond N Phan
(74) *Attorney, Agent, or Firm* — Dickinson Wright RLLP

(57) ABSTRACT

Disclosed are techniques for managing context information for data stored within a computing device. According to some embodiments, the method can include the steps of (1) loading, into a volatile memory of the computing device, the context information from a non-volatile memory of the computing device, where the context information is separated into a plurality of portions, and each portion of the plurality of portions is separated into a plurality of sub-portions, (2) writing transactions into a log stored within the non-volatile memory, and (3) each time a condition is satisfied: identifying a next sub-portion to be processed, where the next sub-portion is included in the plurality of sub-portions of a current portion being processed, identifying a portion of the context information that corresponds to the next sub-portion, converting the portion from a first format to a second format, and writing the portion into the non-volatile memory.

20 Claims, 19 Drawing Sheets

TECHNIQUES FOR MANAGING CONTEXT INFORMATION FOR A STORAGE DEVICE WHILE MAINTAINING RESPONSIVENESS

FIELD

The described embodiments set forth techniques for managing context information for data stored in a non-volatile memory (e.g., a solid-state drive (SSD)) of a computing device. In particular, the techniques involve segmenting the context information to increase the granularity by which it is transmitted between a volatile memory (e.g., a random-access memory (RAM)) and the non-volatile of the computing device, which can substantially enhance operational efficiency.

BACKGROUND

Solid state drives (SSDs) are a type of storage device that share a similar footprint with (and provide similar functionality as) traditional magnetic-based hard disk drives (HDDs). Notably, standard SSDs—which utilize "flash" memory—can provide various advantages over standard HDDs, such as considerably faster Input/Output (I/O) performance. For example, average I/O latency speeds provided by SSDs typically outperform those of HDDs because the I/O latency speeds of SSDs are less-affected when data is fragmented across the memory sectors of SSDs. This occurs because HDDs include a read head component that must be relocated each time data is read/written, which produces a latency bottleneck as the average contiguity of written data is reduced over time. Moreover, when fragmentation occurs within HDDs, it becomes necessary to perform resource-expensive defragmentation operations to improve or restore performance. In contrast, SSDs, which are not bridled by read head components, can preserve I/O performance even as data fragmentation levels increase. SSDs also provide the benefit of increased impact tolerance (as there are no moving parts), and, in general, virtually limitless form factor potential. These advantages—combined with the increased availability of SSDs at consumer-affordable prices—make SSDs a preferable choice for mobile devices such as laptops, tablets, and smart phones.

Despite the foregoing benefits provided by SSDs, some drawbacks remain that have yet to be addressed. In particular, for a given SSD, the size of the organizational data for managing data stored on the SSD—referred to herein as "context information"—scales directly with the amount of data managed by the SSD. This presents a problem given that the overall storage capacities of SSDs are only increasing with time, thereby leading to increased size requirements for the context information. Consequently, large-sized context information for a given SSD can lead to performance bottlenecks with regard to both (i) writing the context information from a volatile memory (e.g., a random-access memory (RAM)) into a non-volatile memory of the SSD, and (ii) restoring the context information when an inadvertent shutdown renders the context information out-of-date. For example, the central processing unit (CPU) of a given computing device can be prevented from processing other tasks (e.g., data read requests, data write requests, etc.) each time the CPU writes-out the context information from the volatile memory to the non-volatile memory. In this regard, large-sized context information can compromise the overall rate of responsiveness exhibited by the computing device, thereby degrading the overall user experience.

Consequently, there exists a need for an improved technique for managing context information for data stored on SSDs to ensure that acceptable performance metrics remain intact even as the size of the context information scales with the ever-increasing capacities of SSDs.

SUMMARY

The described embodiments set forth techniques for managing context information for data stored in a non-volatile memory (e.g., a solid-state drive (SSD)) of a computing device. In particular, the techniques involve partitioning the context information into a collection of "slices" that increase the granularity by which the context information is transferred between a volatile (e.g., a random-access memory (RAM)) memory and the non-volatile of the computing device. In this manner, periodic saves of the context information—as well as restorations of the context information in response to inadvertent shutdowns—can be performed more efficiently.

Accordingly, one embodiment sets forth a method for managing context information for data stored within a non-volatile memory of a computing device. According to some embodiments, the method can be implemented at the computing device, and include the steps of (1) loading, into a volatile memory of the computing device, the context information from the non-volatile memory, where the context information is separated into a plurality of slices, and each slice of the plurality of slices is separated into a plurality of sub-slices, (2) writing transactions into a log stored within the non-volatile memory, and (3) each time a condition is satisfied: identifying a next sub-slice to be processed, where the next sub-slice is included in the plurality of sub-slices of a current slice being processed, identifying a portion of the context information that corresponds to the next sub-slice, where the portion is encoded in a first format, converting the portion from the first format to a second format, and writing the portion into the non-volatile memory.

Another embodiment sets forth a method for restoring context information when an inadvertent shutdown of a computing device occurs. According to some embodiments, the method can be implemented by a computing device, and include the steps of (1) identifying the context information within a non-volatile memory of the computing device, where the context information is separated into a plurality of slices, and each slice of the plurality of slices is separated into a plurality of sub-slices, (2) accessing a log stored within the non-volatile memory, and (3) for each slice of the plurality of slices: loading the plurality of sub-slices of the slice into a volatile memory of the computing device, and in response to identifying, within the log, that at least one transaction (i) applies to the slice, and (ii) occurred after a last write of the slice into the non-volatile memory: updating the slice to reflect the at least one transaction.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

The embodiments disclosed herein set forth techniques for managing context information for data stored within a non-volatile memory (e.g., a solid-state storage device (SSD)) of a computing device. In particular, the techniques involve partitioning the context information into a collection of "slices" in order to increase the granularity by which the context information is transmitted between a volatile memory (e.g., a random-access memory (RAM)) of the computing device and the non-volatile memory of the computing device. Moreover, each slice can be segmented into a collection of "sub-slices" in order to further-increase the granularity by which the context information is transmitted between the volatile memory and the non-volatile memory of the computing device. In this manner, an overall rate of responsiveness exhibited by the computing device can be improved, as a central processing unit (CPU) of the computing device can periodically transition to handling pending read/write requests at each conclusion of processing a current slice/sub-slice of the context information. Additionally, when an inadvertent shutdown of the computing device occurs—and the context information is not up-to-date within the non-volatile memory—the slices of which the context information is comprised can be sequentially accessed/restored (e.g., based on logged transaction information), which further-reduces latency in comparison to restoring the context information in its entirety.

Figure 1A:
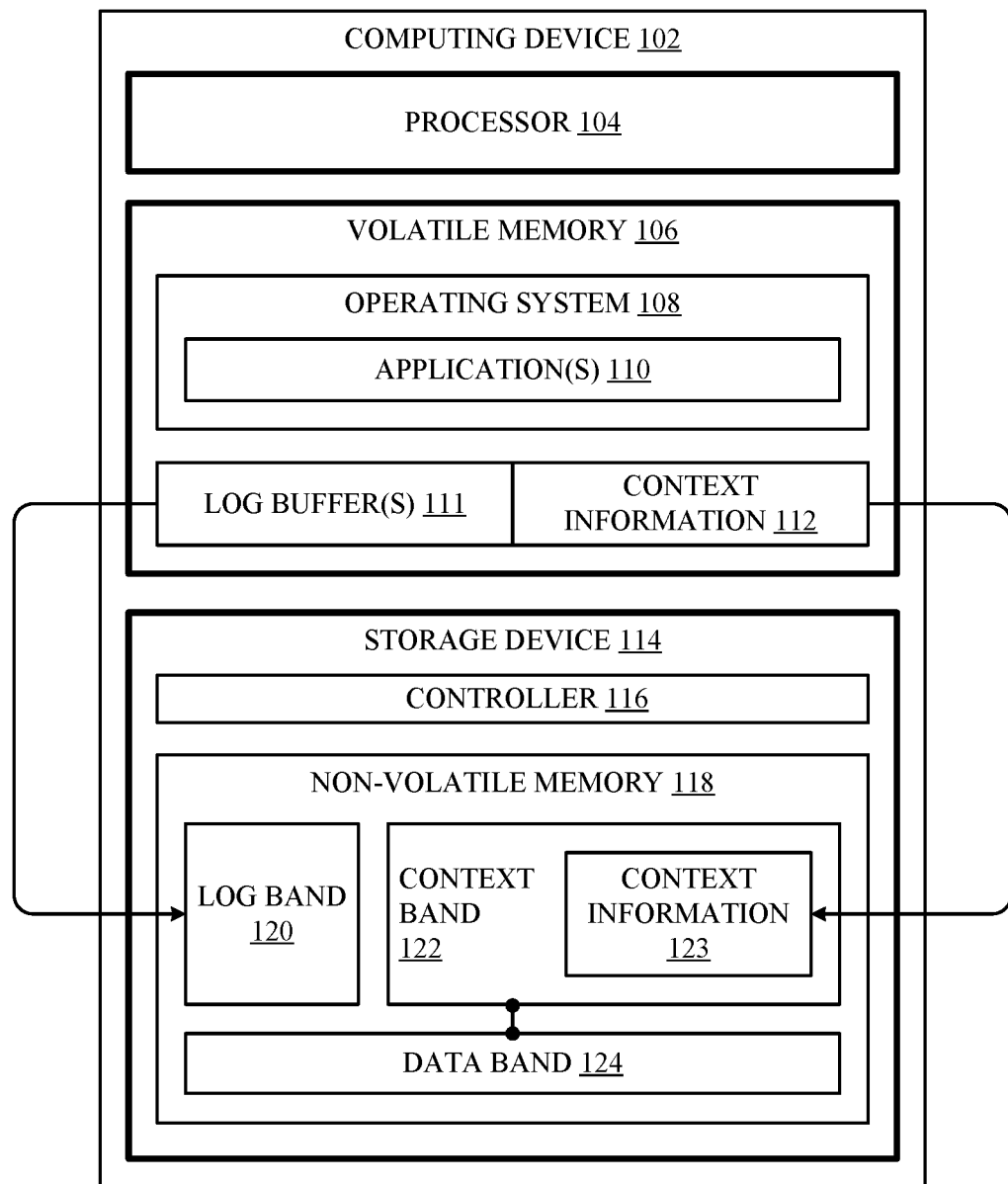
FIGS. 1A-1B illustrate block diagrams of different components of a system that is configured to implement the various techniques described herein, according to some embodiments.

FIG. 1A illustrates a block diagram 100 of a computing device 102—e.g., a smart phone, a tablet, a laptop, a desktop, a server, etc.—that can be configured implement the various techniques described herein. As shown in FIG. 1A, the computing device 102 can include a processor 104 that, in conjunction with a volatile memory 106 (e.g., a dynamic random-access memory (DRAM)) and a storage device 114 (e.g., a solid-state drive (SSD)), enables different software entities to execute on the computing device 102. For example, the processor 104 can be configured to load, from the storage device 114 into the volatile memory 106, various components for an operating system (OS) 108. In turn, the OS 108 can enable the computing device 102 to provide a variety of useful functions, e.g., loading/executing various applications 110 (e.g., user applications). It should be understood that the various hardware components of the computing device 102 illustrated in FIG. 1A are presented at a high level in the interest of simplification, and that a more detailed breakdown is provided below in conjunction with FIG. 8. Additionally, it should be understood that the various components included in the computing device 102 of FIG. 1 are illustrated/discussed in a singular sense in the interest of simplifying this disclosure, and that any of these components can represent two or more components without departing from the scope of this disclosure.

According to some embodiments, and as shown in FIG. 1A, the storage device 114 can include a controller 116 that can be configured to orchestrate the overall operation of the storage device 114. For example, the controller 116 can be configured to process input/output (I/O) requests—referred to herein as "transactions"—issued by the OS 108/applications 110 to the storage device 114. According to some embodiments, the controller 116 can include a parity engine for establishing various parity information for the data stored by the storage device 114 to improve overall recovery scenarios. Additionally, the storage device 114 can include a non-volatile memory 118 (e.g., flash memory) that includes hardware components capable of storing digital information. For example, the non-volatile memory 118 can be composed of a collection of dies. According to some embodiments, different "bands" can be established within the non-volatile memory 118, where each band spans the collection of dies. It is noted that one or more of the dies can be reserved by the storage device 114—e.g., for overprovisioning-based techniques—such that a given band can span a subset of the dies that are available within the non-volatile memory 118.

In this regard, the overall "width" of a band can be defined by the number of dies that the band spans. Continuing with this notion, the overall "height" of the band can be defined by a number of "stripes" into which the band is separated. Additionally, and according to some embodiments, each stripe within the band can be separated into a collection of pages, where each page is disposed on a different die of the non-volatile memory 118. For example, when a given band spans five different dies—and is composed of five different stripes—a total of twenty-five (25) pages are included in the band, where each column of pages is disposed on the same die. In this manner, the data within a given band can be separated across the non-volatile memory 118 in a manner that enables redundancy-based protection to be established without significantly impacting the overall performance of the storage device 114.

As shown in FIG. 1A, the aforementioned bands managed by the storage device 114 can include a log band 120, a context band 122, and a data band 124. According to some embodiments, transaction information associated with the context band 122/data band 124—e.g., details associated with I/O requests processed within the computing device 102—can be written into the log band 120. According to some embodiments, one or more log buffers 111 managed within the volatile memory 106 can be utilized to temporarily store the transaction information prior to writing the transaction information into the log band 120 of the non-volatile memory 118. As described in greater detail herein, this transaction information can be utilized to restore context information stored in the content of the context band 122 when an inadvertent shutdown of the computing device 102 renders at least a portion of the context information out-of-date. According to some embodiments, the content stored in the context band 122 can include context information 123 that provides a mapping table for data stored within the data band 124. As described in greater detail herein, the context information 123 can be stored within the volatile memory 106 as context information 112, where the context information 112 is encoded differently than the context information 123. In this regard, the processor 104 can be configured to periodically read/encode the context information 112 into the context information 123 in a segmented fashion.

Figure 1B:
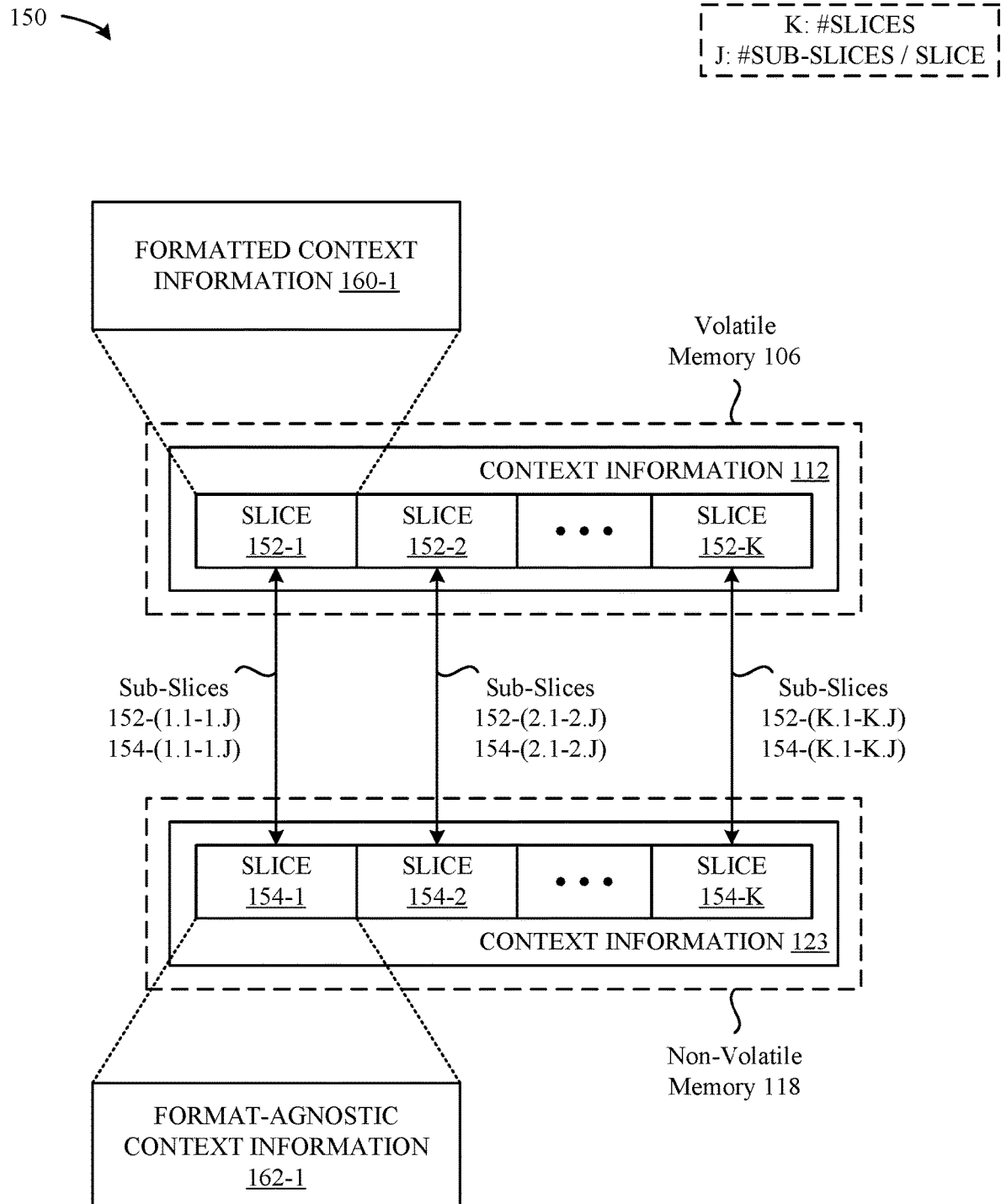

Turning now to the conceptual diagram 150 illustrated in FIG. 1B, it is shown that the context information 112 stored in the volatile memory 106 can be segmented into a collection of slices 152, which, as described in greater detail herein, increases the granularity by which the context information 112 can be transmitted between the volatile memory 106 and the non-volatile memory 118. Moreover, each slice 152 can be segmented into a collection of sub-slices 152.

As a brief aside, and as previously noted herein, each slice 152 can be encoded in accordance with a first format, which is illustrated in FIG. 1B as formatted context information 160. According to some embodiments, the formatted context information 160 can be organized into a hierarchy that includes, at most, first and second depth levels. In particular, the first depth level can correspond to a collection of first-tier entries, while the second depth level can correspond to a collection of second-tier entries. According to some embodiments, the first and second-tier entries can store data in accordance with different encoding formats that coincide with the manner in which the non-volatile memory 118 is partitioned into different sectors. For example, when each sector represents a 4 KB sector of memory, each first-tier entry can correspond to a contiguous collection of two hundred fifty-six (256) sectors. In this regard, the value of a given first-tier entry can indicate whether the first-tier entry (1) directly refers to a physical location (e.g., an address of a starting sector) within the non-volatile memory 118, or (2) directly refers (e.g., via one or more pointers) to one or more second-tier entries. According to some embodiments, when condition (1) is met, it is implied that all (e.g., the two-hundred fifty-six (256)) sectors associated with the first-tier entry are contiguously written, which can provide a compression ratio of 1/256. More specifically, this compression ratio can be achieved because the first-tier entry stores a pointer to a first sector of the two hundred fifty-six (256) sectors associated with the first-tier entry, where no second-tier entries are required. Alternatively, when condition (2) is met, information included in the first-tier entry indicates (i) one or more second-tier entries that are associated with the first-tier entry, as well as (ii) how the information in the one or more second-tier entries should be interpreted. Using this approach, each second-tier entry can refer to one or more sectors, thereby enabling data to be disparately stored across the sectors of the non-volatile memory 118. It is noted that a more detailed description of the formatted context information 160, involving first-tier entries and second-tier entries, is provided below in conjunction with FIG. 4A. However, the indirection techniques set forth herein should not be construed as limiting in any fashion. On the contrary, the embodiments can utilize any approach for implementing the context information without departing from the scope of this disclosure.

Additionally, it is shown that the context information 123—which, as previously described above, corresponds to the context information 112—can be segmented into a collection of slices 154 that respectively correspond to the slices 152 of the context information 112. Moreover, the slices 154 can be segmented into a collection of sub-slices 154 that respectively correspond to the sub-slices 152 of the slices 152. As previously noted herein, each slice 154 can be encoded in accordance with a second format, which is illustrated in FIG. 1B as format-agnostic context information 162. According to some embodiments, the format-agnostic approach can enable the context information 123 stored on the solid-state storage device 114 to be highly-flexible. For example, the format-agnostic context information 162 can be stored in a simplified format that describes the basic layout of data on the storage device 114 relative to logical base addresses (LBAs) associated with the non-volatile memory 118. This simplified approach provides enhanced flexibility in that the computing device 102 can, when loading the context information 123 into the volatile memory 106 (e.g., during a boot of the computing device 102), convert the context information 123 into any desired encoded format that increases the overall operational efficiency of the computing device 102. For example, utilization of the indirection approaches described herein can reduce an overall amount of memory consumed by the context information 112, a speed at which lookups can be carried out against the context information 112, and so on. A more detailed description of the format-agnostic context information 162 is provided below in conjunction with FIG. 4B.

Additionally, although not illustrated in FIG. 1B, it should be understood that each of the slices 152/slices 154—as well as the sub-slices 152/sub-slices 154—can include any information to enable the techniques set forth herein to be properly implemented. For example, metadata for a given slice can set forth descriptive information, e.g., an index of the slice (relative to the other slices), a size of the slice, a number of sub-slices associated with the slice and so on. Moreover, it should be understood that each slice 152/slice 154—as well as the sub-slices thereof—include the respective portion of the context information to which they correspond.

Accordingly, FIGS. 1A-1B provide high-level overviews of the manner in which the computing device 102 can be configured to implement the techniques described herein. A more detailed explanation of these techniques will now be provided below in conjunction with FIGS. 2-8.

Figure 2:
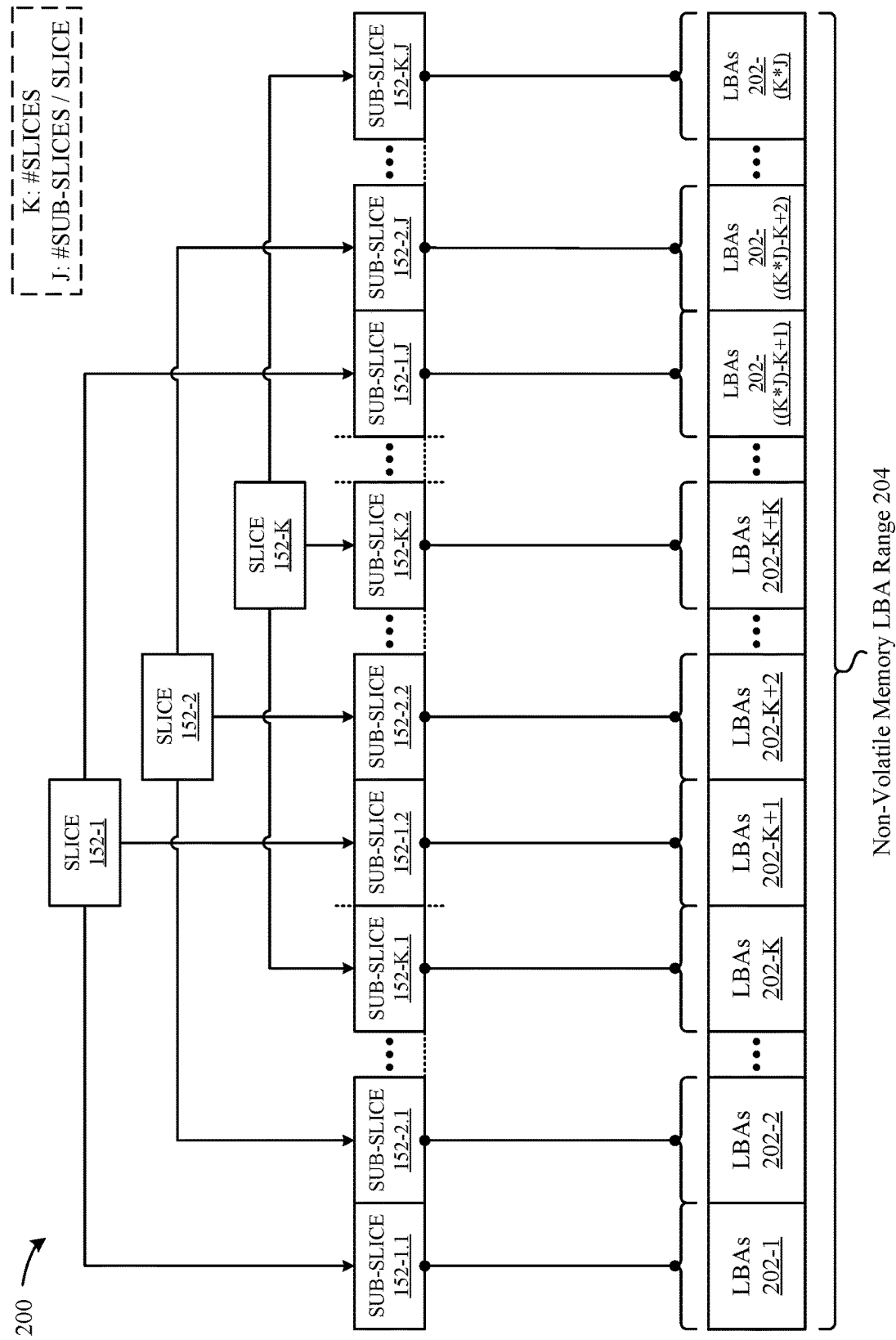
FIG. 2 illustrates a conceptual diagram of an exemplary approach that can be used to disparately distribute slices/sub-slices of context information over a sequential range of logical base addresses (LBAs) associated with a non-volatile memory, according to some embodiments.

FIG. 2 illustrates a conceptual diagram 200 of an exemplary approach that can be used to disparately distribute slices/sub-slices of context information over a sequential range of LBAs associated with the non-volatile memory 118, according to some embodiments. It is noted that, in the interest of simplifying this disclosure, FIG. 2 illustrates sub-slices 152 (of slices 152) of the context information 112 stored in the volatile memory 106, and that the same distribution can apply to sub-slices 154 (of slices 154) of the context information 123 stored in the non-volatile memory 118. As shown in FIG. 2, the context information 112 can be separated into a number of K slices 152 (i.e., "slice 152-K"), and each slice 152-K can be segmented into a number of J sub-slices (i.e., "sub-slice 152-K.J"). In this regard, each sub-slice 152 corresponds to a respective portion of LBAs 202 associated with the non-volatile memory 118 (illustrated in FIG. 2 as a non-volatile memory LBA range 204). In particular, and as shown in FIG. 2, each sub-slice 152 of each slice 152 can be interleaved in succession such that the slices 152/sub-slices 152 disparately cover the non-volatile memory LBA range 204. For example, the context information 112, as a whole, can be segmented into a total of three slices 152 (e.g., slice 152-1, slice 152-2, and slice 152-3)—and each slice 152 can be segmented into a total of three sub-slices 152 (e.g., sub-slices 152-1.1-3, sub-slices 152-2.1-3, and sub-slices 152-3.1-3). Continuing with this example, and in view of the distribution illustrated in FIG. 2, the nine sub-slices 152 would correspond to the non-volatile memory LBA range 204 in the following order: sub-slice 152-1.1, sub-slice 152-2.1, sub-slice 152-3.1, sub-slice 152-1.2, sub-slice 152-2.2, sub-slice 152-3.2, sub-slice 152-1.3, sub-slice 152-2.3, and sub-slice 152-3.3. Notably, this approach can provide the benefit of a naturally load-balanced distribution of data across the non-volatile memory LBA range 204.

Accordingly, FIG. 2 illustrates an exemplary approach that can be used to disparately distribute slices/sub-slices of context information over a sequential range of LBAs associated with the non-volatile memory 118, according to some embodiments. It is noted that this distribution is not a requirement of the embodiments set forth herein, and that any approach can be utilized with regard to how the slices/sub-slices are mapped to the non-volatile memory LBA range 204 without departing from the scope of this disclosure.

Figure 3A:
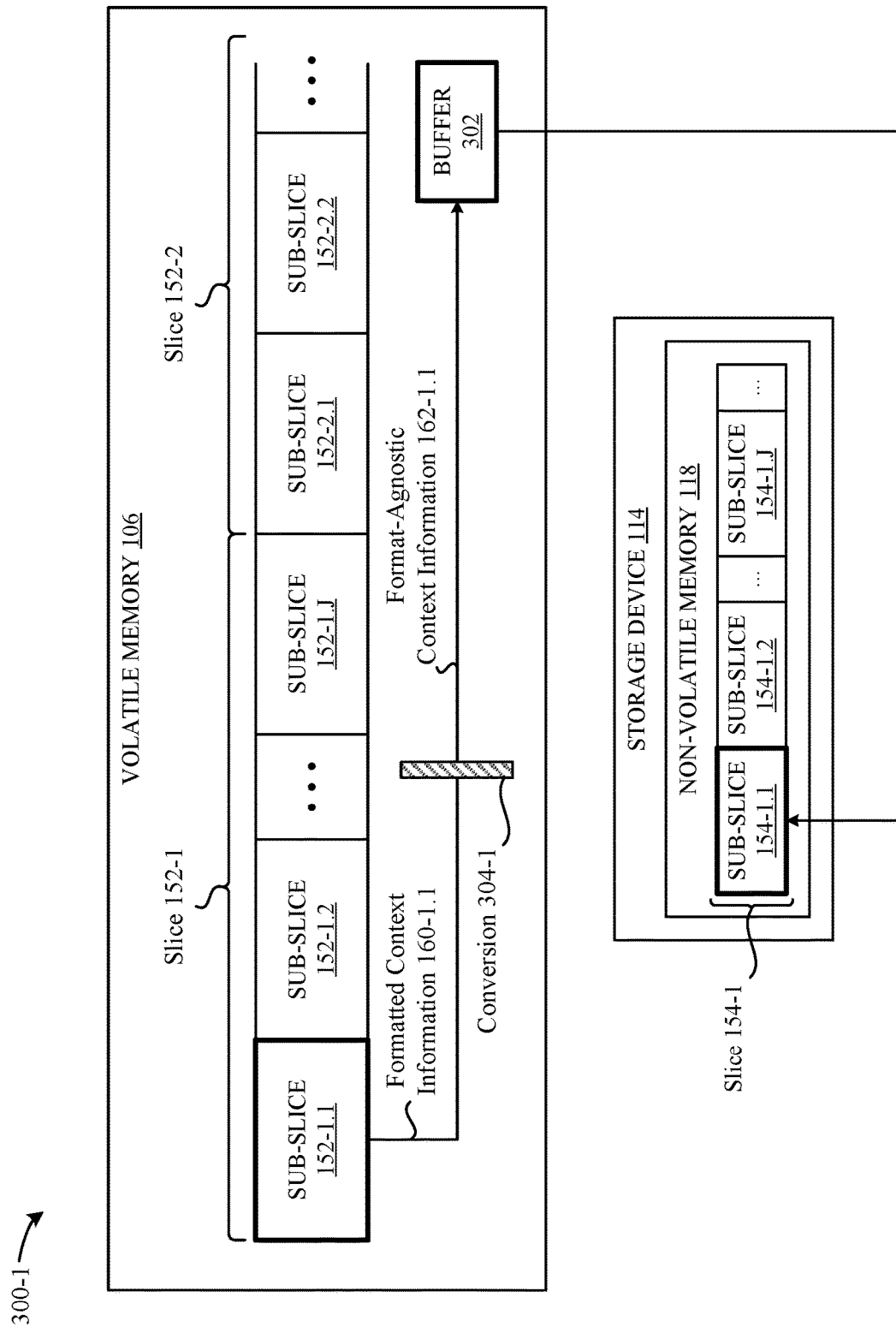
FIGS. 3A-3C illustrate conceptual diagrams of an exemplary approach that can be used to output a slice of context information stored in a volatile memory to a corresponding slice of context information stored in a non-volatile memory, according to some embodiments.
Figure 3B:
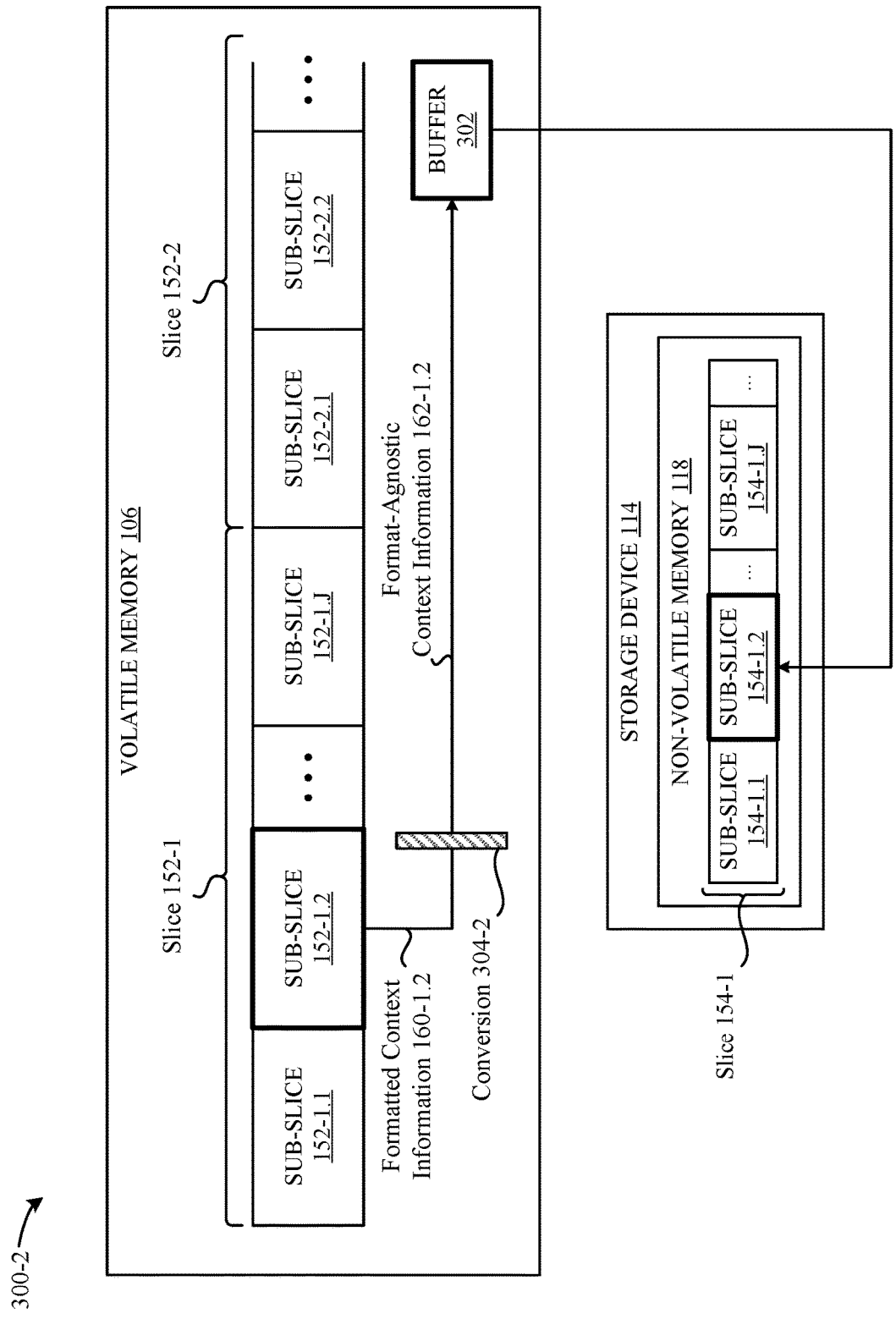
Figure 3C:
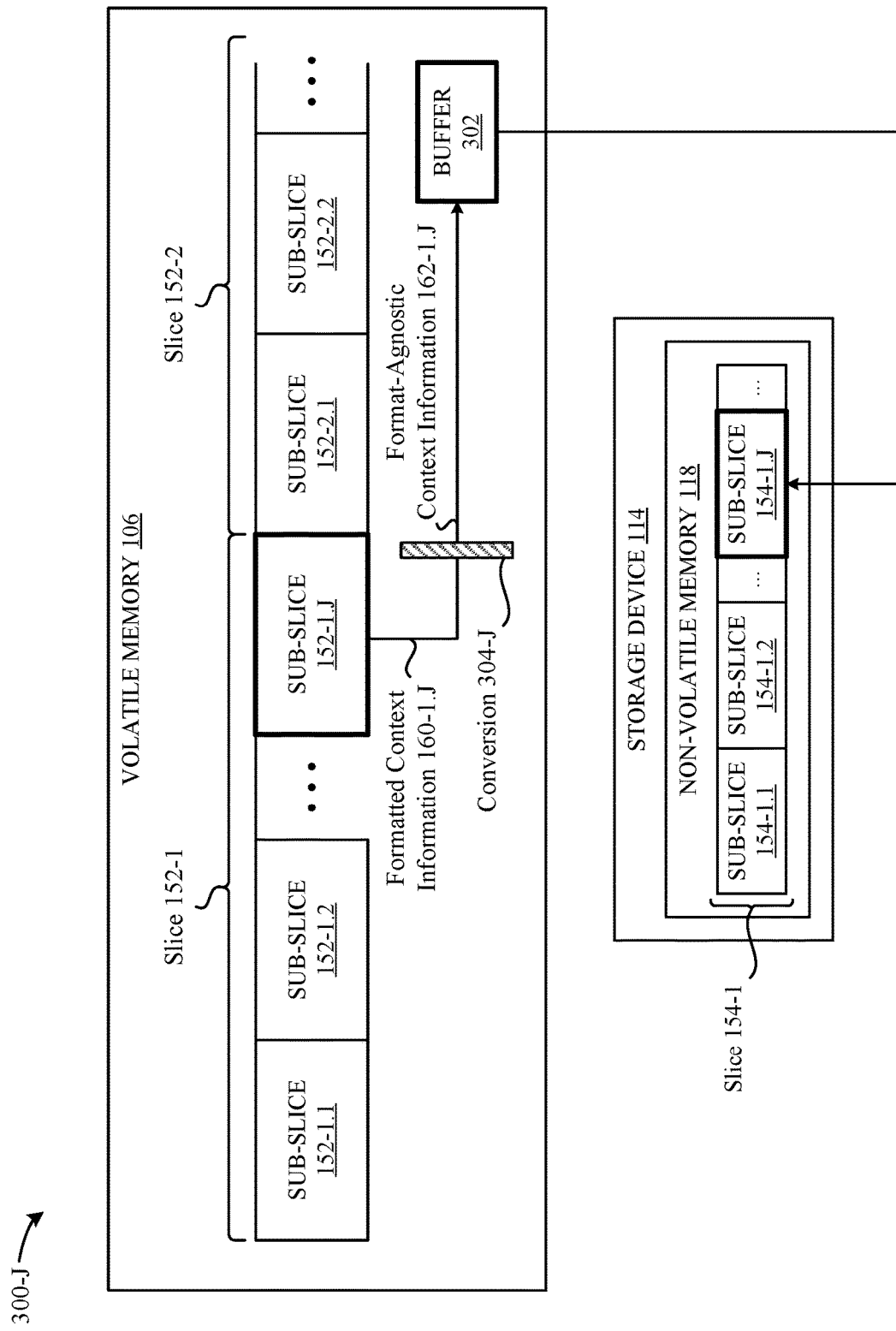

At this juncture, FIGS. 3A-3C illustrate conceptual diagrams 300 of an exemplary approach that can be used to output a slice 152 stored in the volatile memory 106 to a corresponding slice 154 stored in the non-volatile memory 118, according to some embodiments. As shown in FIG. 3A, a first conceptual diagram 300-1 involves the computing device 102 being tasked with outputting (1) the context information 112 of the slice 152-1 stored in the volatile memory 106 to (2) the context information 123 of a corresponding slice 154-1 stored in the non-volatile memory 118. According to some embodiments, this procedure can involve the computing device 102 (1) identifying the first sub-slice 152-1.1 of the slice 152-1, (2) obtaining the formatted context information 160-1.1 associated with the sub-slice 152.1.1, (3) converting, via a conversion procedure 304-1, the formatted context information 160-1.1 to format-agnostic context information 162-1.1, and (4) writing the format-agnostic context information 162-1.1 into a buffer 302 included in the volatile memory 106. In turn, the format-agnostic context information 162-1.1 stored in the buffer 302 can be injected into the corresponding sub-slice 154-1.1 of the slice 154-1 stored in the non-volatile memory 118.

Turning now to FIG. 3B, a second conceptual diagram 300-2 involves the computing device 102 being tasked with (1) identifying the second sub-slice 152-1.2 of the slice 152-1, (2) obtaining the formatted context information 160-1.2 associated with the second sub-slice 152.1.2, (3) converting, via a conversion procedure 304-2, the formatted context information 160-1.2 to format-agnostic context information 162-1.2, and (4) writing the format-agnostic context information 162-1.2 into the buffer 302. In turn, the format-agnostic context information 162-1.2 stored in the buffer 302 can be injected into a corresponding sub-slice 154-1.2 of the slice 154-1 stored in the non-volatile memory 118.

Additionally, a third conceptual diagram 300-3 illustrated in FIG. 3C sets forth that the same techniques described above in conjunction with FIGS. 3A-3B can be applied to each successive sub-slice 152-1.J of the slice 152-1 until all of the sub-slices 152-1.J of the slice 152-1 have been processed. As described in greater detail below in conjunction with FIGS. 5-7, the computing device 102 can be tasked with performing similar operations on successive slices 152 to the slice 152-1 in a round-robin, continuous fashion, to ensure that the context information 123 stored on the non-volatile memory 118 is largely up-to-date and can reliably be rebuilt in the event of a power failure. As a brief aside, FIGS. 4A-4B will now be described, which illustrate additional details with regard to how the formatted context information 160 and the format-agnostic context information 162 can be managed, as well as how the information transmitted between the volatile memory 106 and the non-volatile memory 118 can be converted between these formats (e.g., as described above in conjunction with the conversion procedures 304) to implement the techniques set forth herein.

Figure 4A:
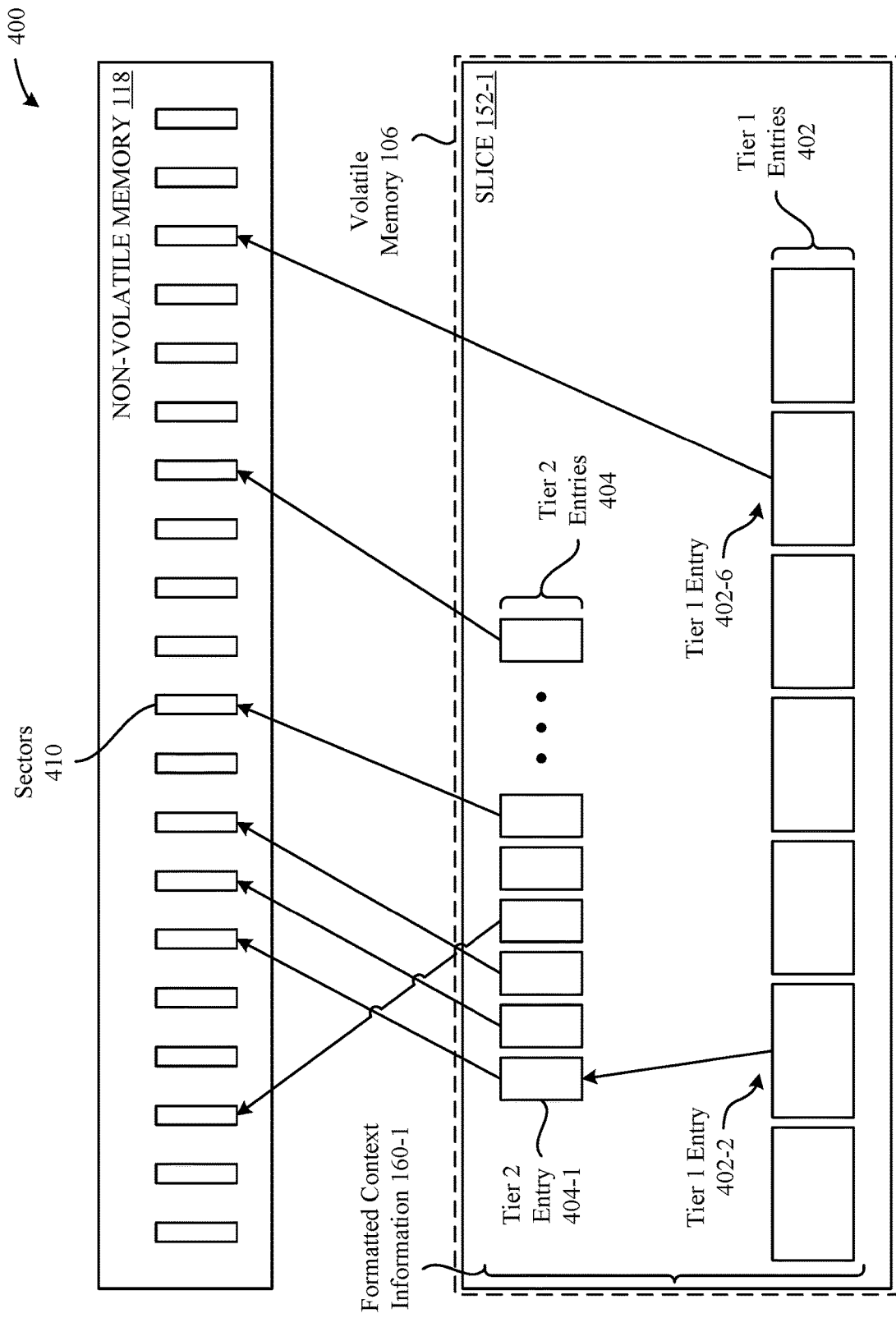
FIGS. 4A-4B illustrate how different formats can be utilized when storing context information within a volatile memory and a non-volatile memory, according to some embodiments.

FIG. 4A illustrates a conceptual diagram 400 of an example approach that can be used to implement the formatted context information 160, according to some embodiments. As shown in FIG. 4A, the formatted context information 160 for a given slice 152—in particular, the slice 152-1—can involve utilizing, at most, first and second tier entries that reference data stored within different sectors 410 of the non-volatile memory 118, according to some embodiments. As shown in FIG. 4A, several tier 1 entries 402 associated with the slice 152-1 are depicted, where at least one of the tier 1 entries 402—in particular, the tier 1 entry 402-6—does not reference any tier 2 entries 404. Instead, the tier 1 entry 402-6 directly-references a particular sector 410 of the non-volatile memory 118. According to this example, the tier 1 entry 402-6 can represent a "pass-through" first-tier entry that corresponds to a contiguous span of sectors 410 (as described above in conjunction with FIG. 1B). As also illustrated in FIG. 4A, at least one of the tier 1 entries 402—in particular, the tier 1 entry 402-2—references at least one of the tier 2 entries 404—in particular, the tier 2 entry 404-1. In this regard, the tier 2 entry 404-2—along with any other tier 2 entries 404 that correspond to the tier 1 entry 402-2—establish an indirect reference between the tier 1 entry 402-2 and at least one sector 410 of the non-volatile memory 118.

Accordingly, the indirection techniques described in conjunction with FIG. 4A can enable each LBA to refer to content stored in the non-volatile memory 118 through only one or two levels of hierarchy, thereby providing a highly-efficient architecture on which the various techniques described herein can be implemented. To provide additional understanding of the format-agnostic context information 162 described herein, FIB. 4B illustrates a conceptual diagram 450 of an example scenario that sets forth the manner in which the context information 123 associated with a given slice 154—in particular, the slice 154-1—can be stored in a simplified manner (relative to the formatted context information 160), according to some embodiments. As previously described above in conjunction with FIG. 1B, the format-agnostic approach can enable the context information 123 stored on the solid-state storage device 114 to be highly-flexible. In particular, the format-agnostic context information 162 can be stored in a simplified format that describes the basic layout of data on the storage device 114 relative to LBAs associated with the non-volatile memory 118. This notion is illustrated in FIG. 1B, where the slice 154-1 includes a collection of band/offset/counter elements (NOBs) 412 that collectively describe the manner in which the data of the LBAs that correspond to the slice 154-1 are distributed across the sectors 410 of the non-volatile memory 118. It is noted that the collection of NOBs 412 represents one exemplary approach, and that a singular data component can be utilized to described the manner in which the data of the LBAs that correspond to the slice 154-1 are distributed across the sectors 410 of the non-volatile memory 118, without departing from the scope of this disclosure.

Figure 4B:
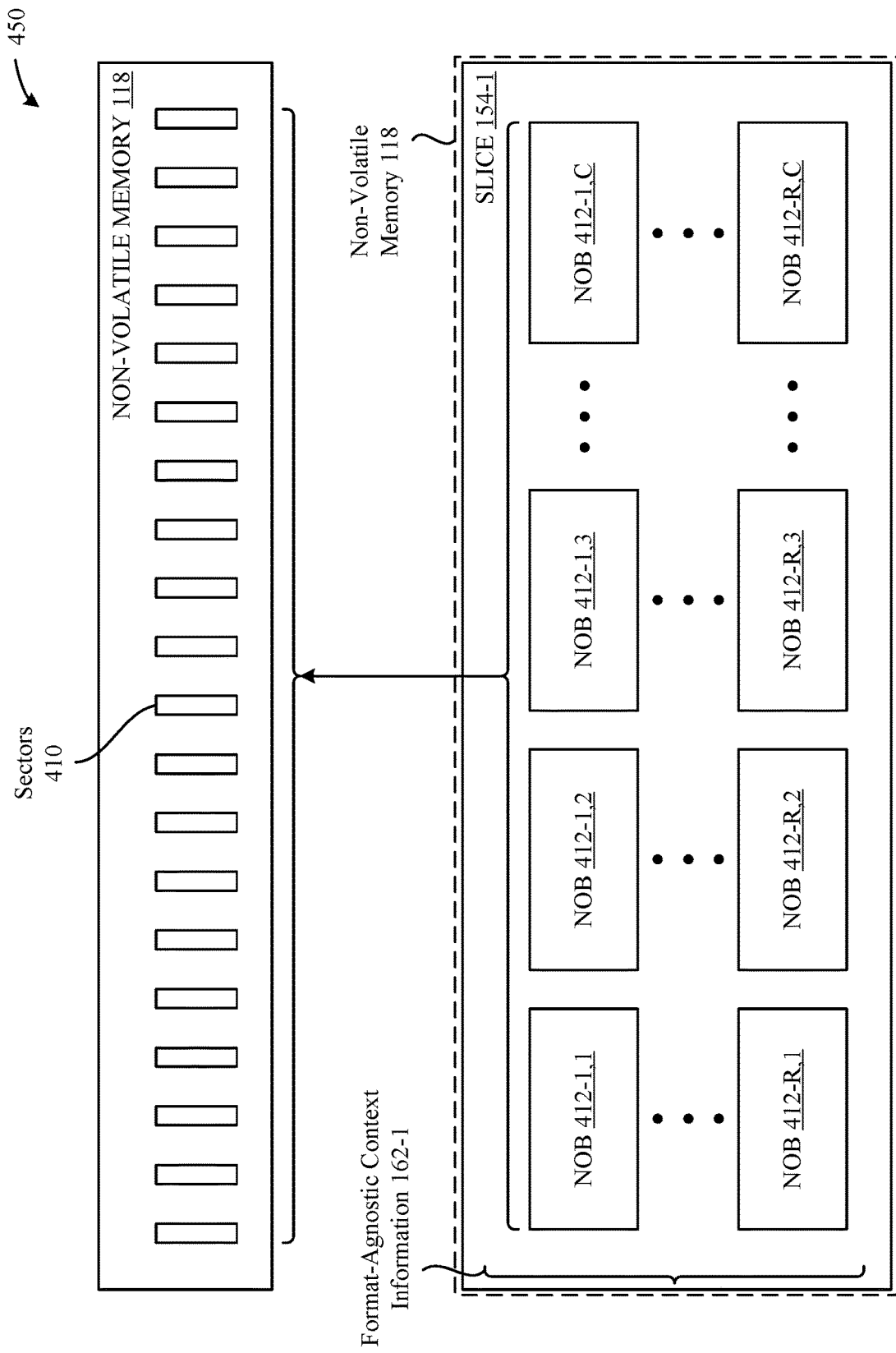

Accordingly, FIG. 4B illustrates the manner in which the context information 123 can be stored in a simplified form to provide enhanced flexibility. In particular, the enhanced flexibility can be provided because the computing device 102 can, when loading the context information 123 into the volatile memory 106 (e.g., during a boot of the computing device 102), convert the context information 123—which is stored in a simplified form—into any desired encoded format that increases the overall operational efficiency of the computing device 102. In this regard, software/hardware updates to the computing device 102 can be implemented without requiring a complete re-encoding of the context information 123, which otherwise might be required if stored in an encoded format instead of the simplified format.

At this juncture, FIGS. 5A-5H provide conceptual diagrams of an example scenario in which the various techniques described herein can be utilized to improve the overall operational efficiency of the computing device 102. In particular, the example scenario illustrated in FIGS. 5A-5E involves efficiently writing slices 152 (i.e., context information 112) from the volatile memory 106 into the non-volatile memory 118 as slices 154 (i.e., context information 123) as transactions are received and carried out by the computing device 102. Moreover, the example scenario illustrated in FIGS. 5F-5H involves the computing device 102 (1) encountering an inadvertent shutdown that compromises the overall coherency of the context information 123 stored in the non-volatile memory 118, and (2) efficiently carrying out a procedure to restore the coherency of the context information 123. It is noted that, in the interest of simplifying this disclosure, the example scenario set forth in FIGS. 5A-5H involves a total of four slices, where each slice is separated into four sub-slices. However, as previously described herein, the context information 112/context information 123 can be separated into any number of slices/sub-slices without departing from the scope of this disclosure.

Figure 5A:
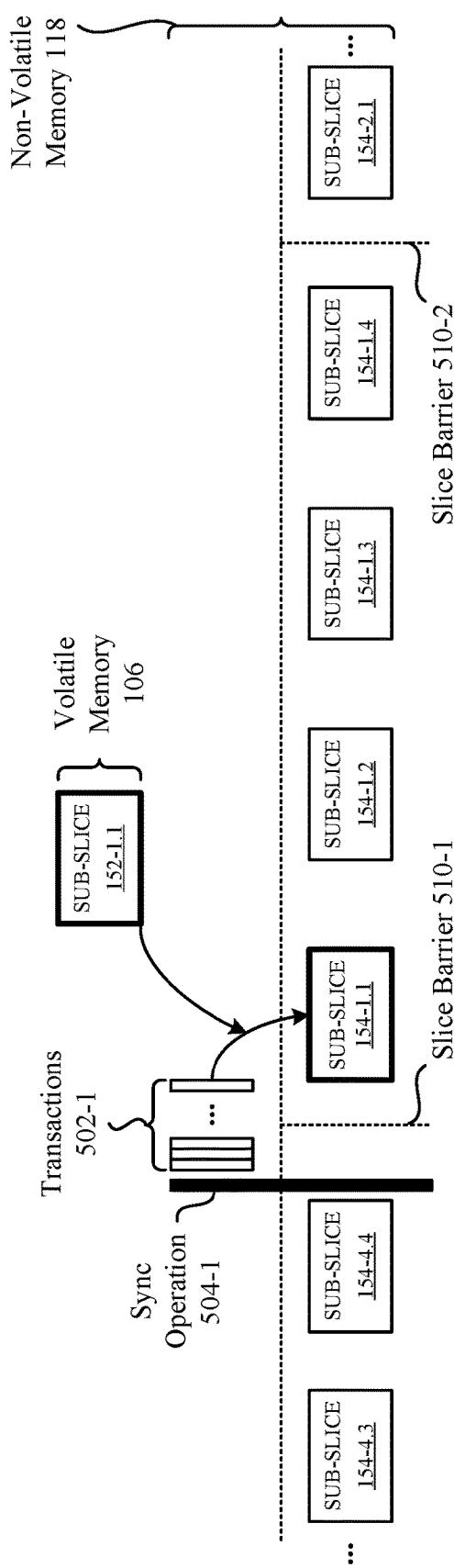
FIGS. 5A-5H provide conceptual diagrams of an example scenario in which the various techniques described herein can be utilized to improve the overall operational efficiency of a computing device, according to some embodiments.
Figure 5A:
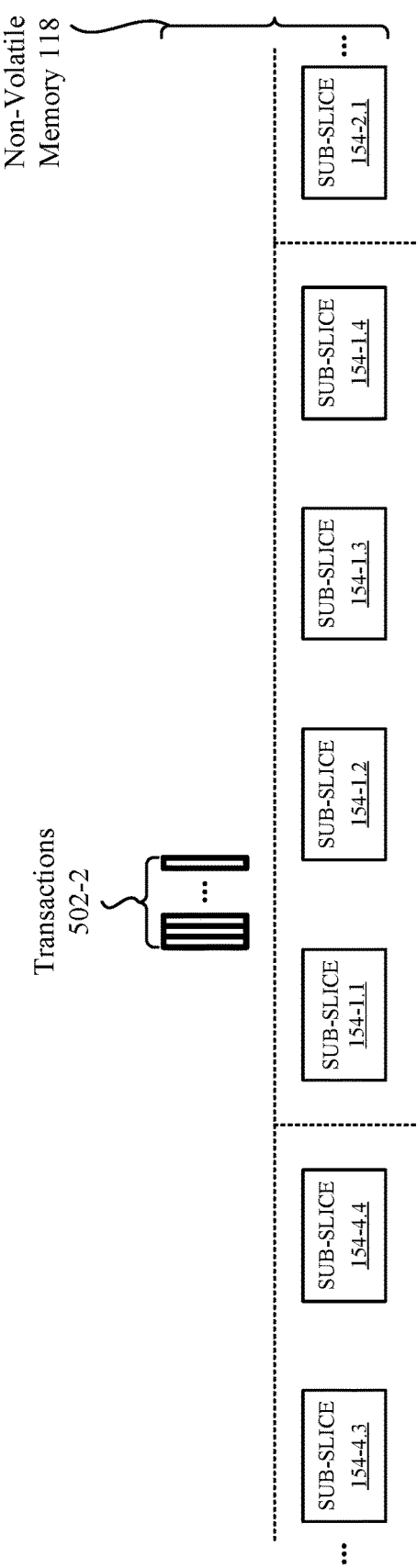

To provide a detailed understanding of the circular manner in which the slices 152 are written from the volatile memory 106 into the non-volatile memory 118, a first step in FIG. 5A occurs after a synchronization operation 504-1 is executed. According to some embodiments, each synchronization operation 504 can involve the computing device 102 writing parity information into one or more of the log band 120, the context band 122, or the data band 124 (e.g., to implement data recovery/redundancy features). Each synchronization operation 504 can also involve writing, into the log band 120, an identifier associated with a last slice 152 that was processed in its entirety—i.e., where all sub-slices 152 of the slice 152 were processed—which, as described below in greater detail, can enable the computing device 102 to identify an appropriate starting point when restoring the context information 123 in response to an inadvertent shutdown the compromises the overall integrity of the context information 123. It is noted that the foregoing tasks implemented by the computing device 102 when carrying out the synchronization operations 504 are not meant to represent an exhaustive list, and that the computing device 102 can be configured to carry out additional/common tasks without departing from the scope of this disclosure.

Returning now to FIG. 5A, the first step occurs in conjunction with receiving and processing transactions 502-1. As a brief aside, it is noted that each transaction 502 can represent one or more I/O requests that are directed toward the storage device 114. For example, a transaction 502 can involve writing, modifying, or removing data from the data band 124 within the non-volatile memory 118. It is noted that the foregoing example is not meant to be limiting, and that the transactions 502 described herein encompass any form of I/O operation(s) directed toward the non-volatile memory 118 of the storage device 114. Although not illustrated in FIGS. 5A-5H, it is noted that transaction information associated with each of the transactions 502 can be recorded within the log band 120 within the non-volatile memory 118 (e.g., by way of the log buffers 111, as previously described above in conjunction with FIG. 1A). According to some embodiments, different log files can be managed within the log band 120 and can be used to store transaction information associated with the transactions as they are processed. Moreover, redundant copies of log file portions can be stored within the log band 120, thereby improving the efficacy of recovery procedures even when severe failure events take place. For example, for each log file portion stored on a first die of the non-volatile memory 118, a copy of the log file portion can be stored on a second (i.e., different) die of the non-volatile memory 118. In this manner, each log file portion can be recovered even when the first or the second die fails within the non-volatile memory 118.

Returning now to FIG. 5A, it is noted that the satisfaction of one or more conditions—e.g., a threshold number of transactions being received, an amount of time lapsing, a particular functionality being executed (e.g., garbage collection, defragmentation, etc.), and the like—can provoke the computing device 102 to transition from processing transactions 502 to managing the context information. Moreover, various operational aspects of the computing device 102 can influence the manner in which the computing device 102 transitions between processing the transactions 502 and the context information, as well as the manner in which the context information is segmented into slices/sub-slices. For example, the computing device 102 can be configured to implement any calculations for establishing time metrics associated with the transactions 502 and utilize the time metrics to effectively identify various configurations that can be implemented to achieve required performance levels. In particular, the computing device 102 can segment the context information into fewer slices/sub-slices when the computing device 102 estimates that relatively few transactions are (or will be) carried out on average by the computing device 102. Alternatively, the computing device 102 can segment the context information into more slices/sub-slices when the computing device 102 estimates that many transactions are (or will be) carried out on average by the computing device 102. In yet another example, the computing device 102 can analyze the types of transactions 502 that are processed by the computing device 102 and dynamically re-configure the manner in which the context information is segmented into slices/sub-slices. It is noted that the foregoing examples are not meant to represent an exhaustive list, and that any number of conditions, associated with any aspects of the operation of the computing device 102, can be considered to influence the manner in which the computing device 102 transitions between processing the transactions 502 and the context information—as well as the manner in which the context information is segmented into slices/sub-slices—without departing from the scope of this disclosure.

When this transition occurs, the computing device 102 can be configured to identify (1) a current slice 152 being processed (e.g., based on relative slice barriers 510), as well as (2) a next sub-slice 152 of the current slice 152 to be processed. In this regard, and as will be made evident in the subsequent steps illustrated throughout FIGS. 5A-5E, successive slices/sub-slices are written from the volatile memory 106 into the non-volatile memory 118 in a round-robin/continuous fashion. As shown in step one of FIG. 5A, the current slice 152 is the slice 152-1, and the next sub-slice 152 is the sub-slice 152-1.1 of the slice 152-1. In this regard, the computing device 102 can be configured to (1) parse the formatted context information 160 associated with the sub-slice 152-1.1, (2) convert the formatted context information 160 into format-agnostic context information 162 (e.g., as described above in conjunction with FIGS. 4A-4B), and (3) store the format-agnostic context information 162 into a corresponding sub-slice 154 within the non-volatile memory 118—which, as shown in FIG. 5A, is the sub-slice 154-1.1.

As a brief aside, it is additionally noted that processing each sub-slice 152 of a given slice 152 can involve transmitting supplemental information without departing from the scope of this disclosure. For example, processing a given sub-slice 152 can involve transmitting metadata associated with the sub-slice 152. Moreover, it is noted that the sub-slice 152—in particular, the context information 112 to which the sub-slice 152 corresponds—can be placed into a "locked" state while the sub-slice 152 is updated/written from the volatile memory 106 to the non-volatile memory 118 to ensure that the state of the corresponding context information 112 is not inappropriately modified.

Accordingly, when the sub-slice 152-1.1 is written to the sub-slice 154-1.1, the computing device 102 can, at a second step, transition back to processing transactions 502-2—if any—that are outstanding. As a brief aside, it is noted that, by frequently switching between processing transactions 502 and sequential portions of the context information 112, the computing device 102 can maintain an overall rate of responsiveness while improving recovery opportunities in inadvertent shutdown scenarios. In this regard, the computing device 102 can implement any technique that influences the manner in which the transactions 502 are processed relative to the context information 112 to achieve desired quality of service levels. For example, the computing device 102 can segment the context information 112 into a large number of slices 152/sub-slices 152 that increases the overall rate at which the computing device 102 switches to processing outstanding transactions 502, at the potential cost of degrading recovery scenario viability. In another example, the computing device 102 can segment the context information 112 into a smaller number of slices 152/sub-slices 152 that decreases the overall rate at which the computing device 102 switches to processing outstanding transactions 502, while potentially improving recovery scenario viability.

Figure 5B:
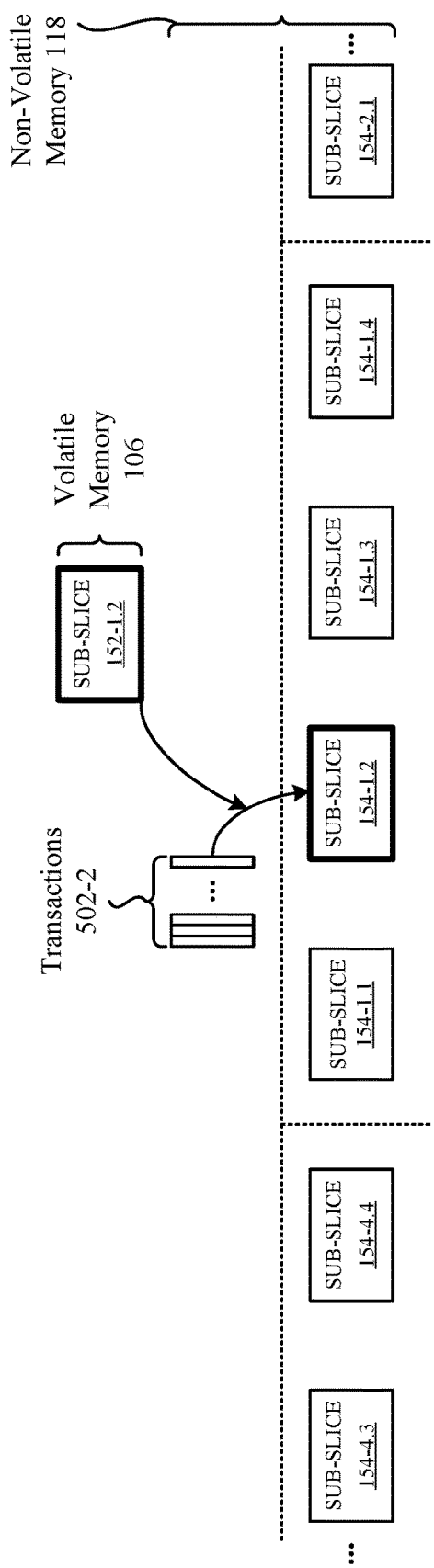
Figure 5B:
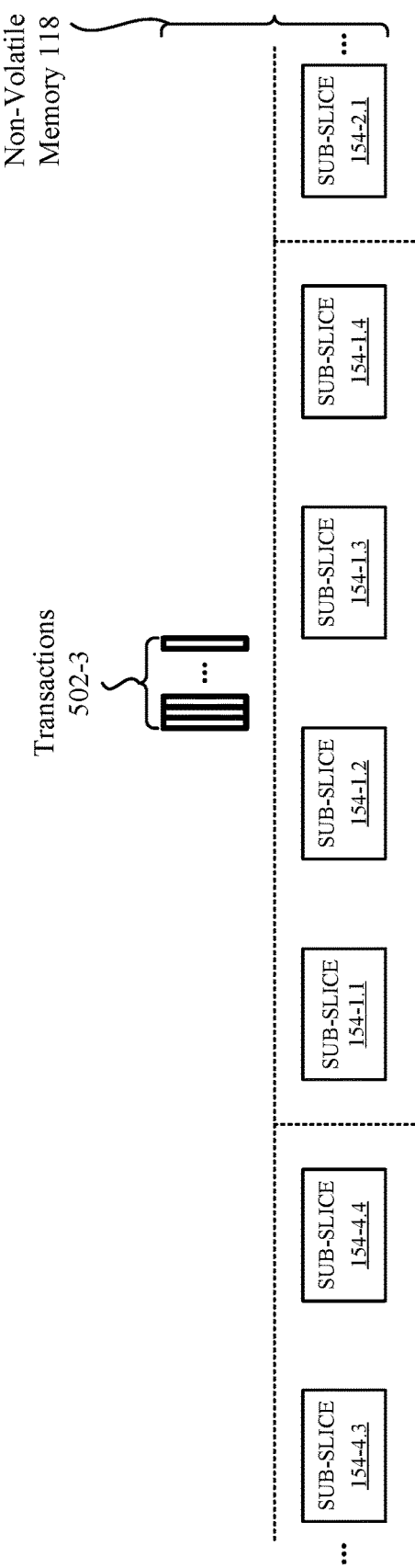

Returning now to FIG. 5A, at the conclusion of step two, the transactions 502-2 are processed by the computing device 102, which can affect any of the context information 112 to which the slices 152 (and sub-slices thereof) correspond. Turning now to FIG. 5B, a third step can involve the computing device 102 transitioning from processing the transactions 502-2, to identifying (1) the current slice 152 being processed, as well as (2) a next sub-slice 152 of the current slice 152 to be processed. As shown in step 3 of FIG. 5B, the current slice 152 is still the slice 152-1 (as not all sub-slices 152 of the sub-slice 152-1 have been processed), and the next sub-slice 152 is the sub-slice 152-1.2 of the slice 152-1. In this regard, the computing device 102 can be configured to (1) parse the formatted context information 160 associated with the sub-slice 152-1.2, (2) convert the formatted context information 160 into format-agnostic context information 162, and (3) store the format-agnostic context information 162 into a corresponding sub-slice 154 within the non-volatile memory 118—which, as shown in FIG. 5B, is the sub-slice 154-1.2.

Figure 5C:
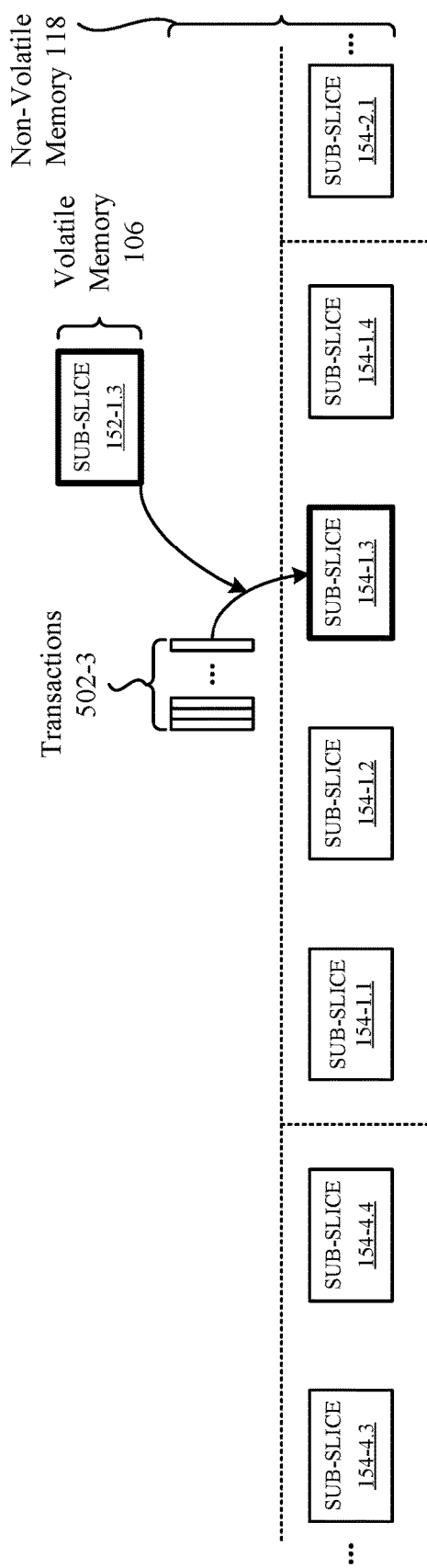
Figure 5C:
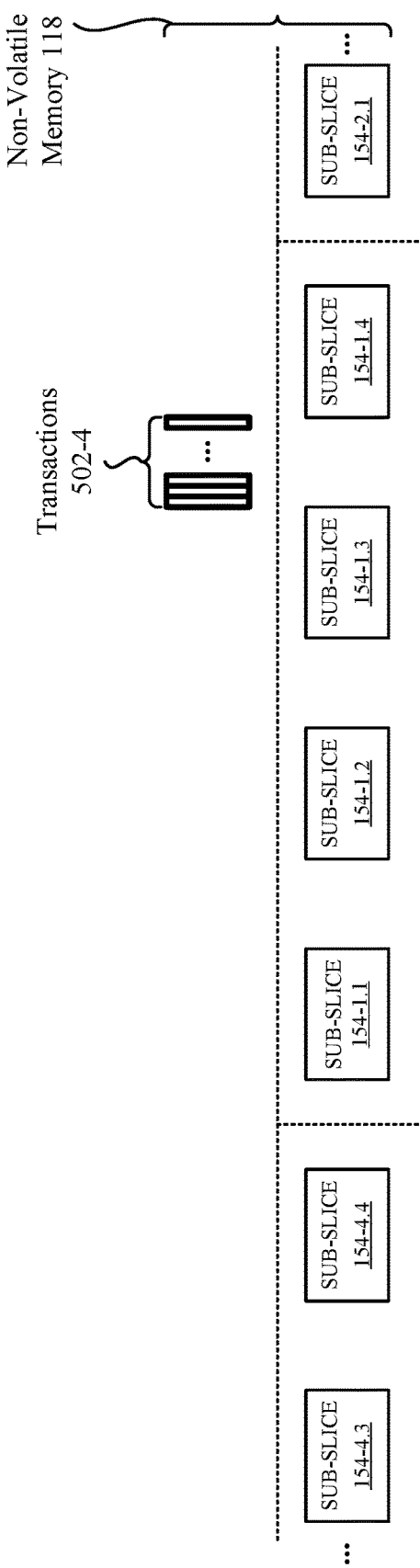

Accordingly, when the sub-slice 152-1.2 is written to the sub-slice 154-1.2, the computing device 102 can transition back to processing transactions 502-3, if any, that are outstanding. This notion is represented in FIG. 5B by step four. At the conclusion of step 4, the transactions 502-3 are processed by the computing device 102, which can affect any of the context information 112 to which the slices 152 (and sub-slices thereof) correspond. Turning now to FIG. 5C, a fifth step can involve the computing device 102 transitioning from processing the transactions 502-3, to identifying (1) the current slice 152 being processed, as well as (2) a next sub-slice 152 of the current slice 152 to be processed. As shown in step 5 of FIG. 5C, the current slice 152 is still the slice 152-1 (as not all sub-slices 152 of the sub-slice 152-1 have been processed), and the next sub-slice 152 is the sub-slice 152-1.3 of the slice 152-1. In this regard, the computing device 102 can be configured to (1) parse the formatted context information 160 associated with the sub-slice 152-1.3, (2) convert the formatted context information 160 into format-agnostic context information 162, and (3) store the format-agnostic context information 162 into a corresponding sub-slice 154 within the non-volatile memory 118—which, as shown in FIG. 5B, is the sub-slice 154-1.3.

Figure 5D:
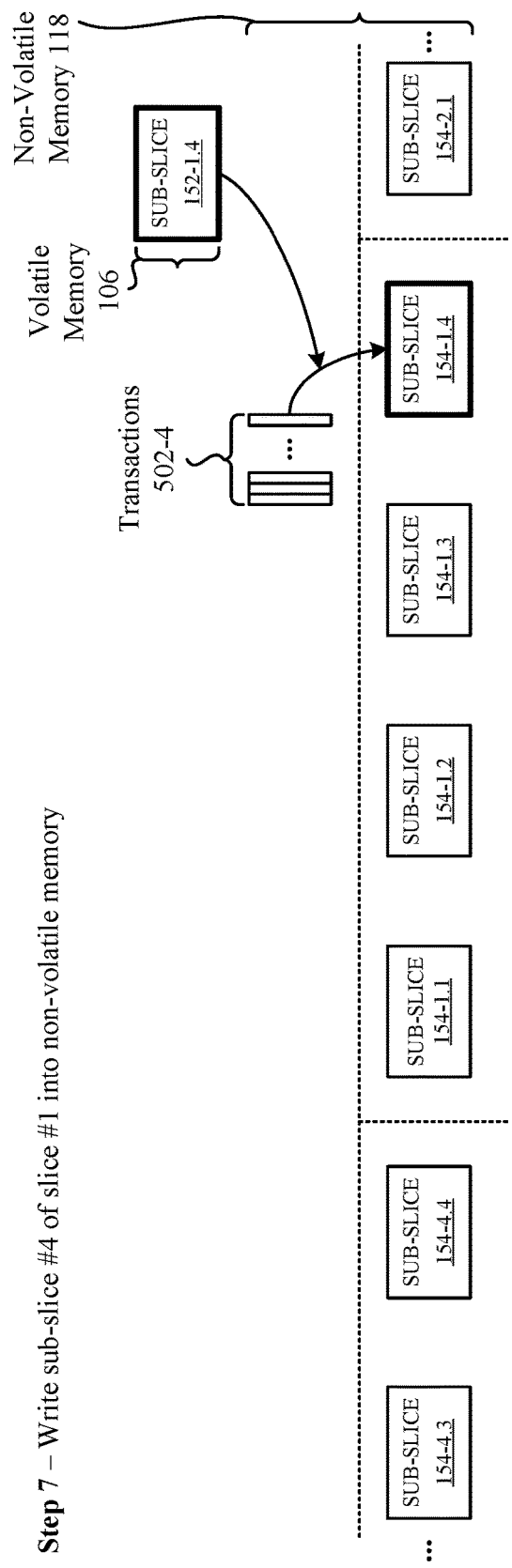
Figure 5D:
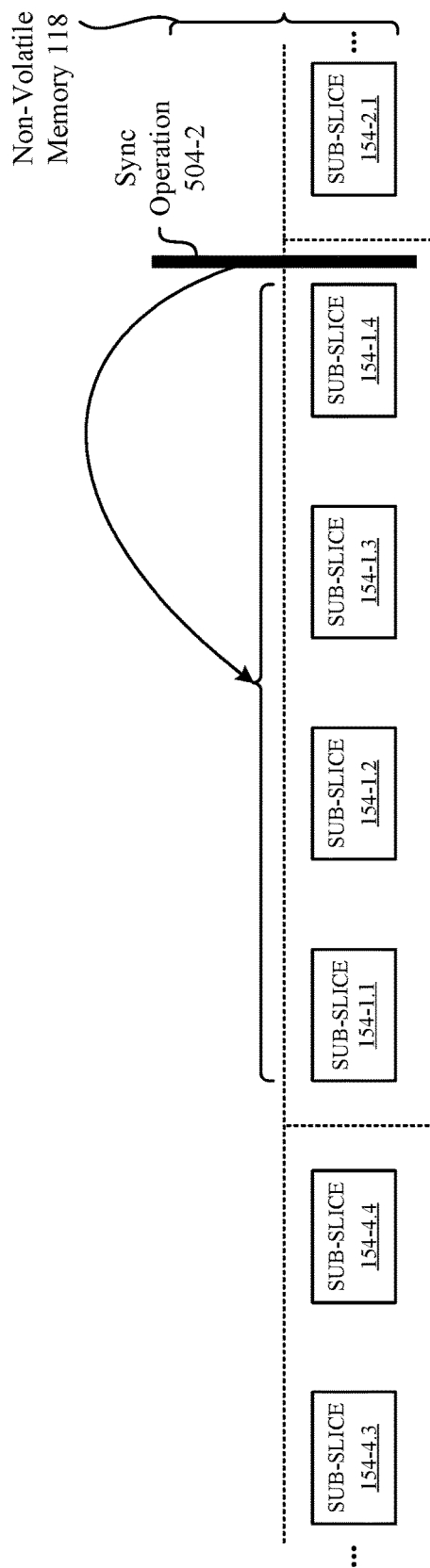

Accordingly, when the sub-slice 152-1.3 is written to the sub-slice 154-1.3, the computing device 102 can transition back to processing transactions 502-4, if any, that are outstanding. This notion is represented in step six of FIG. 5B. At the conclusion of step six, the transactions 502-4 are processed by the computing device 102, which can affect any of the context information 112 to which the slices 152 (and sub-slices thereof) correspond. Turning now to FIG. 5D, a seventh step can involve the computing device 102 transitioning from processing the transactions 502-4, to identifying (1) the current slice 152 being processed, as well as (2) a next sub-slice 152 of the current slice 152 to be processed. As shown in step 7 of FIG. 5D, the current slice 152 is still the slice 152-1 (as not all sub-slices 152 of the sub-slice 152-1 have been processed), and the next sub-slice 152 is the sub-slice 152-1.4 of the slice 152-1. In this regard, the computing device 102 can be configured to (1) parse the formatted context information 160 associated with the sub-slice 152-1.4, (2) convert the formatted context information 160 into format-agnostic context information 162, and (3) store the format-agnostic context information 162 into a corresponding sub-slice 154 within the non-volatile memory 118—which, as shown in FIG. 5B, is the sub-slice 154-1.4.

When the sub-slice 152-1.4 is written to the sub-slice 154-1.4, the computing device 102 can identify that all sub-slices 152 of the slice 152 have been processed, and that a new synchronization operation 504 should occur. Accordingly, at step eight in FIG. 5D, the computing device 102 can carry out a synchronization operation 504-2—which, as described above, can involve the computing device 102 writing parity information into one or more of the log band 120, the context band 122, or the data band 124 (e.g., to implement data recovery/redundancy features). The synchronization operation 504-2 can also involve the computing device 102 writing, into the log band 120, an identifier associated with the slice 152-1 to indicate that all sub-slices 152 associated with the slice 152-1 were effectively processed (i.e., converted/output from the volatile memory 106 to the non-volatile memory 118). In this regard, at the conclusion of processing a given slice 152 in its entirety, the computing device 102 can generate a key that corresponds to the slice 152—e.g., "SLICE_1", "1", etc.—and place the key into the log band 120. In this manner, the log band 120 can be parsed at a later time to identify that the slice 152 was the last-processed slice 152. As described below in greater detail in conjunction with FIGS. 5F-5H, the indication of the last-written slice can enable the recovery techniques described herein to be implemented in an efficient manner.

Figure 5E:
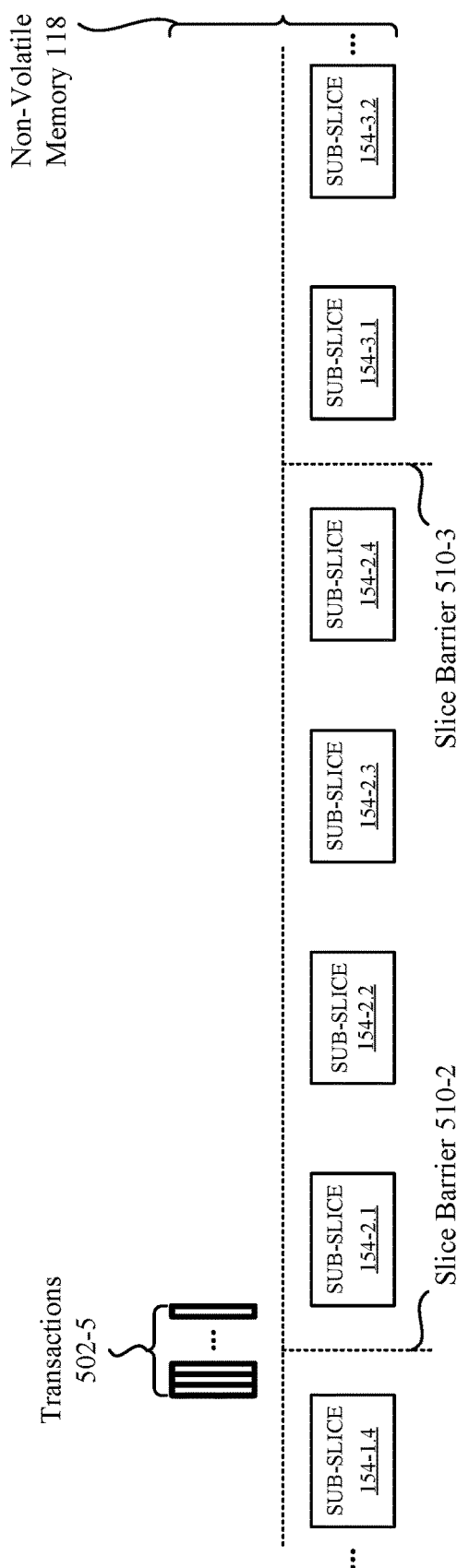
Figure 5E:
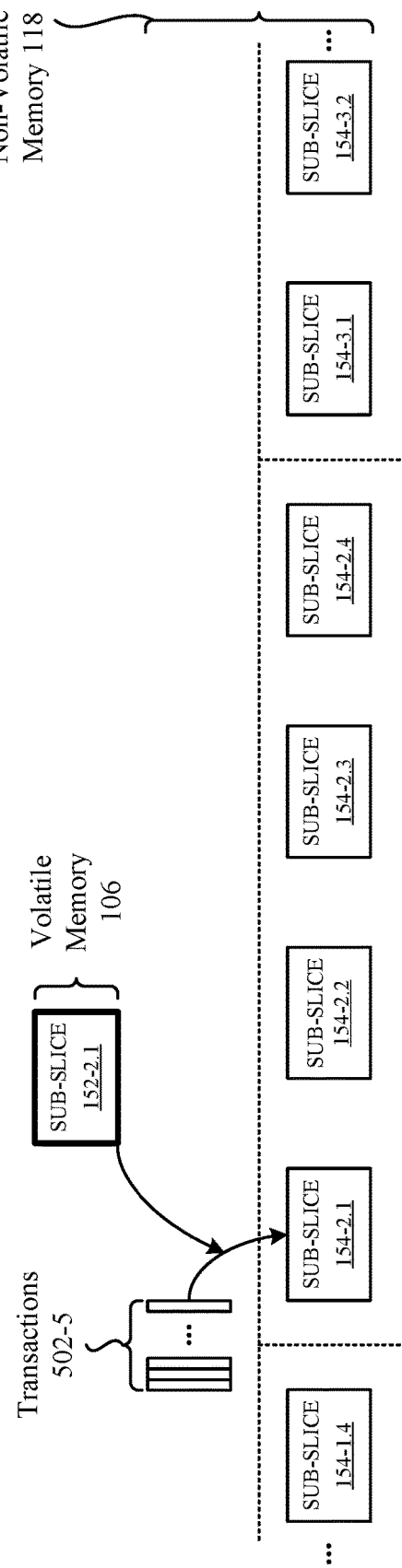

Turning now to FIG. 5E, at the conclusion of the synchronization operation 504-2, the computing device 102 can resume processing outstanding transactions 502 and writing out subsequent slices 152 from the volatile memory 106 into slices 154 within the non-volatile memory 118. In this regard, and as shown at step nine of FIG. 5E, the computing device 102 processes transactions 502-5. At the conclusion of step nine, the transactions 502-5 are processed by the computing device 102, which can affect any of the context information 112 to which the slices 152 (and sub-slices thereof) correspond. Next, a step ten in FIG. 5E can involve the computing device 102 transitioning from processing the transactions 502-5, to identifying (1) the current slice 152 being processed, as well as (2) a next sub-slice 152 of the current slice 152 to be processed. As shown in step ten of FIG. 5E, the current slice 152 is now the slice 152-2—as processing the slice 152-1 is completed, but not all sub-slices 152 of the sub-slice 152-2 have been processed—and the next sub-slice 152 is the sub-slice 152-2.1 of the slice 152-2. In this regard, the computing device 102 can be configured to (1) parse the formatted context information 160 associated with the sub-slice 152-2.1, (2) convert the formatted context information 160 into format-agnostic context information 162, and (3) store the format-agnostic context information 162 into a corresponding sub-slice 154 within the non-volatile memory 118—which, as shown in FIG. 5E, is the sub-slice 154-2.1.

When the sub-slice 152-2.1 is written to the sub-slice 154-2.1, the computing device 102 can transition back to processing transactions 502, if any, that are outstanding. Accordingly, the various steps illustrated in FIGS. 5A-5E provide a detailed understanding of the benefits that can be achieved through segmenting the context information 112 when writing it from the volatile memory 106 to the non-volatile memory 118. As previously described herein, these benefits can also apply to recovery scenarios in which an inadvertent shutdown places the context information 123 (stored in the non-volatile memory 118) into an out-of-date state (relative to the data stored on the non-volatile memory 118), and where the transaction information stored in the log band 120 can be utilized to place the context information 123 back into an up-to-date state.

Accordingly, an example recovery scenario will now be described in detail in conjunction with FIGS. 5F-5H. In particular, a recovery scenario can be prompted at step eleven of FIG. 5F, where an inadvertent shutdown 520 occurs after processing transactions 502-6, but prior to processing the remaining sub-slices 152 of the slice 152-2—i.e., the sub-slices 152-2.2, 152-2.3, and 152-2.4. In this regard, the inadvertent shutdown 520 can cause a scenario in which (1) at least one transaction that affects a given slice 152 has been written into the log band 120, and (2) the slice 152 has not been written from the volatile memory 106 into the non-volatile memory 118. In this scenario, the corresponding slice 154 stored within the non-volatile memory 118 is out-of-date, as the state of the slice 154 does not appropriately reflect the at least one transaction. Accordingly, it is necessary to restore the slice 154 to an up-to-date state (in accordance with the at least one transaction) to ensure that the storage device 114—and the computing device 102 as a whole—correctly reflect the state of data stored on the storage device 114.

Figure 5F:
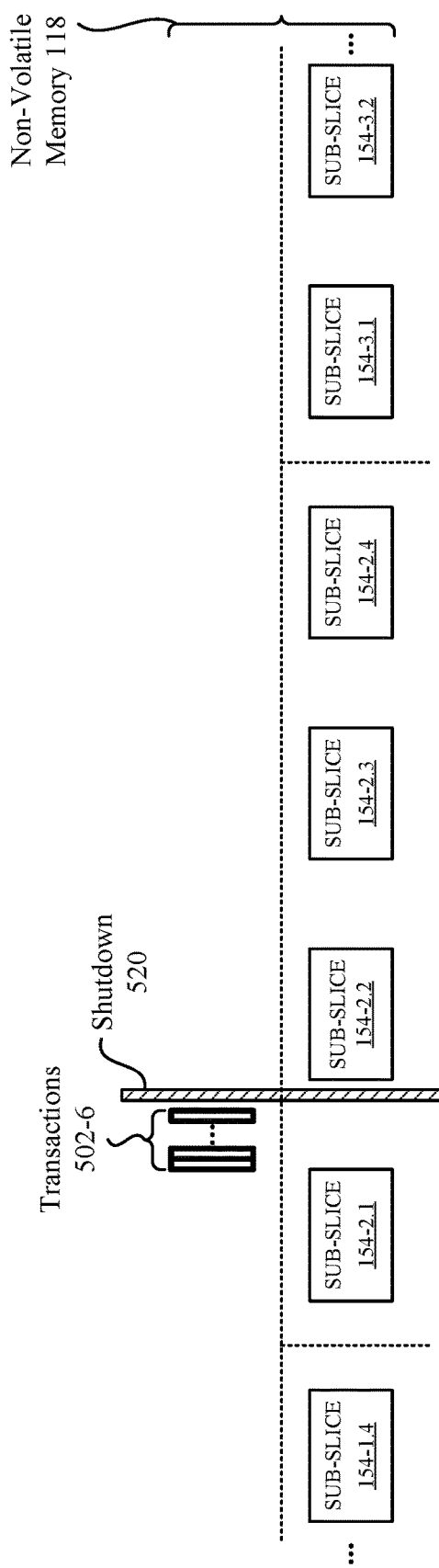
Figure 5F:
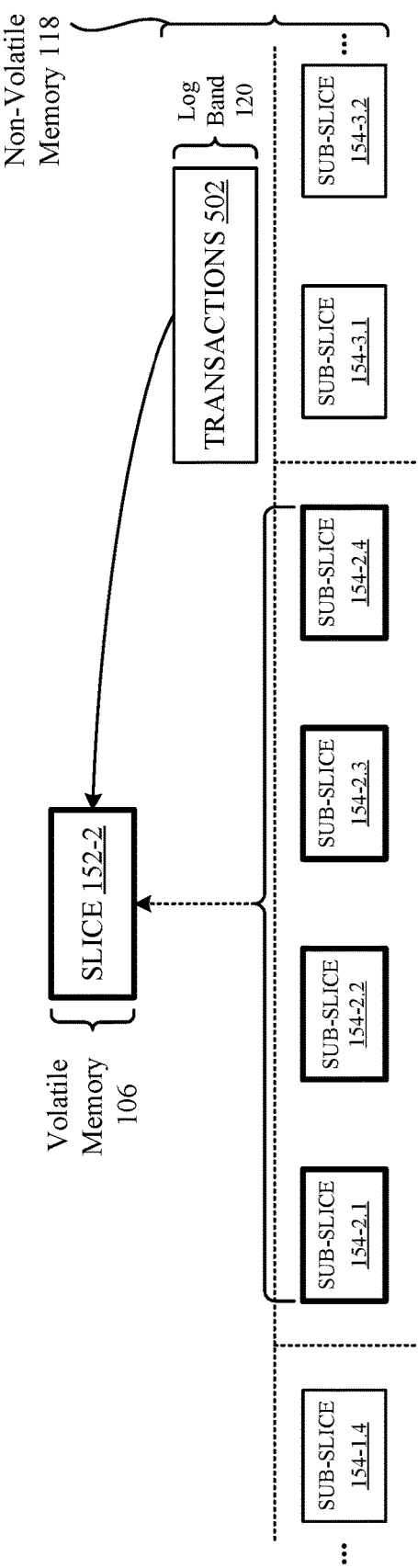
Figure 5G:
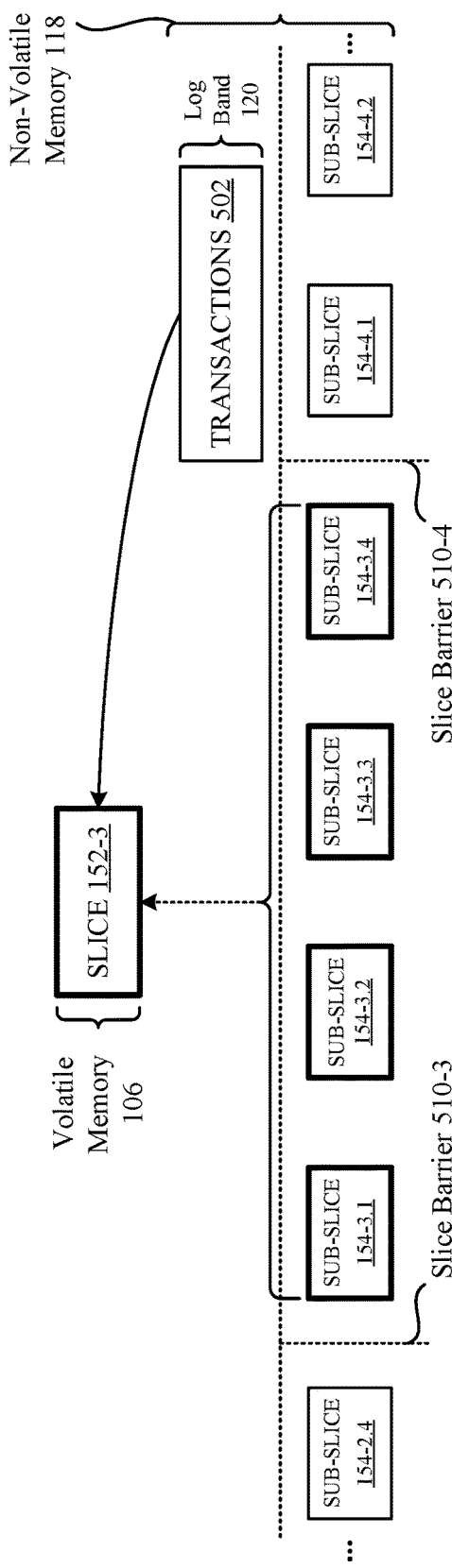
Figure 5G:
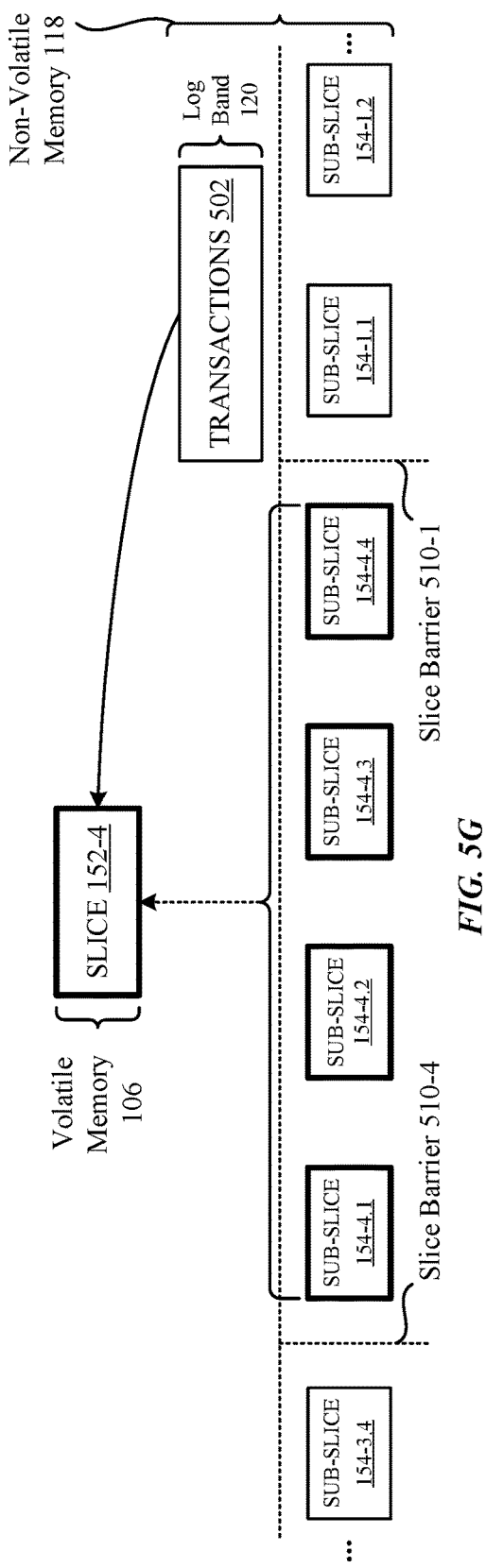
Figure 5H:
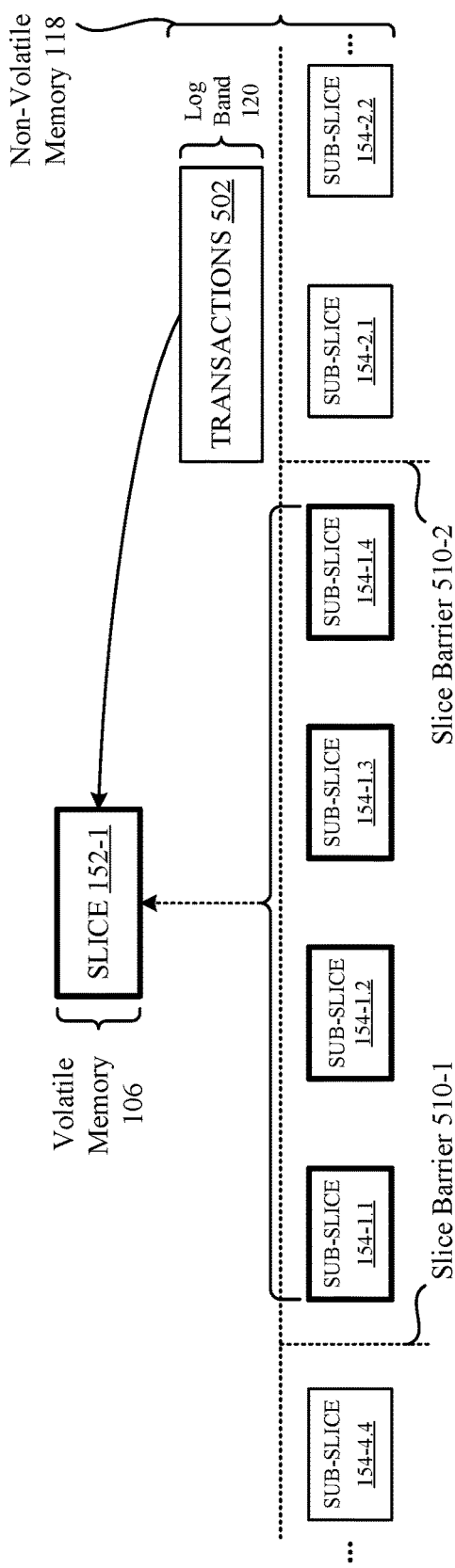
Figure 5H:
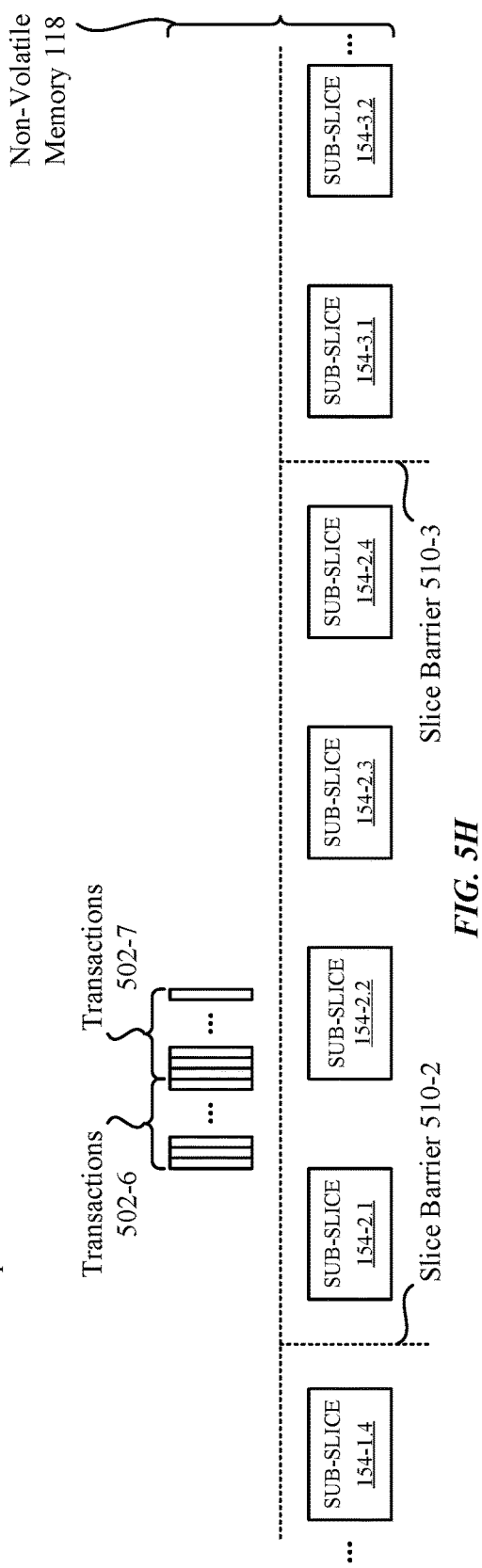

Accordingly, FIG. 5F continues the example recovery scenario, and involves step twelve, in which the computing device 102 initializes a recovery procedure (e.g., during a boot, reboot, wakeup, etc., of the computing device 102) to restore the context information 123. As shown in FIG. 5F, a step twelve can involve the computing device 102 identifying that the slice 154-1 was the last slice 154 that was completely written—i.e., all sub-slices 154 thereof—from the volatile memory 106 into the non-volatile memory 118, as not all sub-slices 152 of the slice 152-2 were processed in their entirety. As previously described above, the computing device 102 can reference the log band 120—e.g., the transaction logs, the keys stored therein, etc.—to identify that the slice 154-1 was the last-written slice 154. In turn, to carry out the recovery procedure, the computing device 102 can load the slice 154-2 into the volatile memory 106 (as a corresponding slice 152-2). According to some embodiments, the computing device 102 can choose to load the slice 154-2 first because the slice 154-2 is the most out-of-date slice 154 relative to the other slices 154 stored in the non-volatile memory 118, with the assumption that the slices 154 are written in a sequential, circular, and repetitive fashion (e.g., as described herein). In this regard, it can be efficient to restore the slice 154-2 first, as it is likely that the slice 154-2 will require the most updates relative to the other slices 154.

Accordingly, as shown in step twelve of FIG. 5F—the slice 154-2 is loaded into the volatile memory 106 as a corresponding slice 152-2. Notably, because the slice 154-2 includes format-agnostic context information 162, the computing device 102 can convert the format-agnostic context information 162 to the formatted context information 160, when loading the slice 154-2 to the volatile memory 106 as the corresponding slice 152-2. In turn, the computing device 102 can identify, e.g., within the transaction information stored in the log band 120—any transactions that (1) apply to the slice 154-2, and (2) occurred after the slice 154-2 was last-written (in its entirety—i.e., all sub-slices 154 thereof) from the volatile memory 106 to the non-volatile memory 118. In turn, if the computing device 102 identifies any transactions using the foregoing criteria, the computing device 102 can "replay" the transactions against the slice 152-2 stored in the volatile memory 106. This can involve, for example, updating first/second tier entries included in the slice 152-2 (as described herein) so that they reference the appropriate areas of the non-volatile memory 118 (in accordance with the transactions).

According to some embodiments, when the transactions have been effectively replayed, the slice 152-2 is in an up-to-date state, and the slice 152-2 can be written from the volatile memory 106 to the non-volatile memory 118. Notably, because the slice 152-2 includes formatted context information 160, the computing device 102 can convert the formatted context information 160 to the format-agnostic context information 162, when writing the slice 152-2 into the corresponding slice 154-2 within the non-volatile memory 118 (as described herein). Additionally, the transaction information stored in the log band 120 can be updated to reflect that the slice 154-2 has, in its entirety, been successfully written. According to some embodiments, the computing device 102 can implement this reflection by executing the various functions related to a synchronization operation 504 (as described herein). In this manner, if another inadvertent shutdown occurs during the recovery procedure, the same updates made to the slice 154-2 during the restoration will not need to be carried out again, thereby increasing efficiency. Alternatively, the slice 154-2 can be written from the volatile memory 106 into the non-volatile memory 118 in due course, e.g., when the computing device 102 resumes normal operation after the recovery procedure is completed in its entirety.

At this juncture, it is noted that additional transactions 502 can potentially apply to one or more of the remaining three slices 154-3, 154-4, and 154-1. Accordingly, FIGS. 5G-5H illustrate steps 13-15 of the recovery procedure, which involve restoring each of the remaining three slices 154-3, 154-4, and 154-1 in accordance with the same procedures described in conjunction with FIG. 5F. For example, a step thirteen illustrated in FIG. 5G illustrates a recovery procedure for the slice 154-3 that is carried out by the computing device 102. Additionally, a step fourteen illustrated in FIG. 5G illustrates a recovery procedure for the slice 154-4 that is carried out by the computing device 102. Additionally, a step fifteen illustrated in FIG. 5H illustrates a recovery procedure for the slice 154-1 that is carried out by the computing device 102. In turn, at step sixteen illustrated in FIG. 5H, each of the four slices 154-1, 154-2, 154-3, and 154-4 have been properly restored, whereupon the computing device 102/storage device 114 can enter back into a normal operating mode and process new transactions 502-7.

Accordingly, FIGS. 5A-5H provide conceptual diagrams of an example scenario in which the various techniques described herein can be utilized to improve the overall operational efficiency of the computing device 102. To provide further context, FIGS. 6-7 illustrate method diagrams that can be carried out to implement the various techniques described herein, which will now be described below in greater detail.

Figure 6:
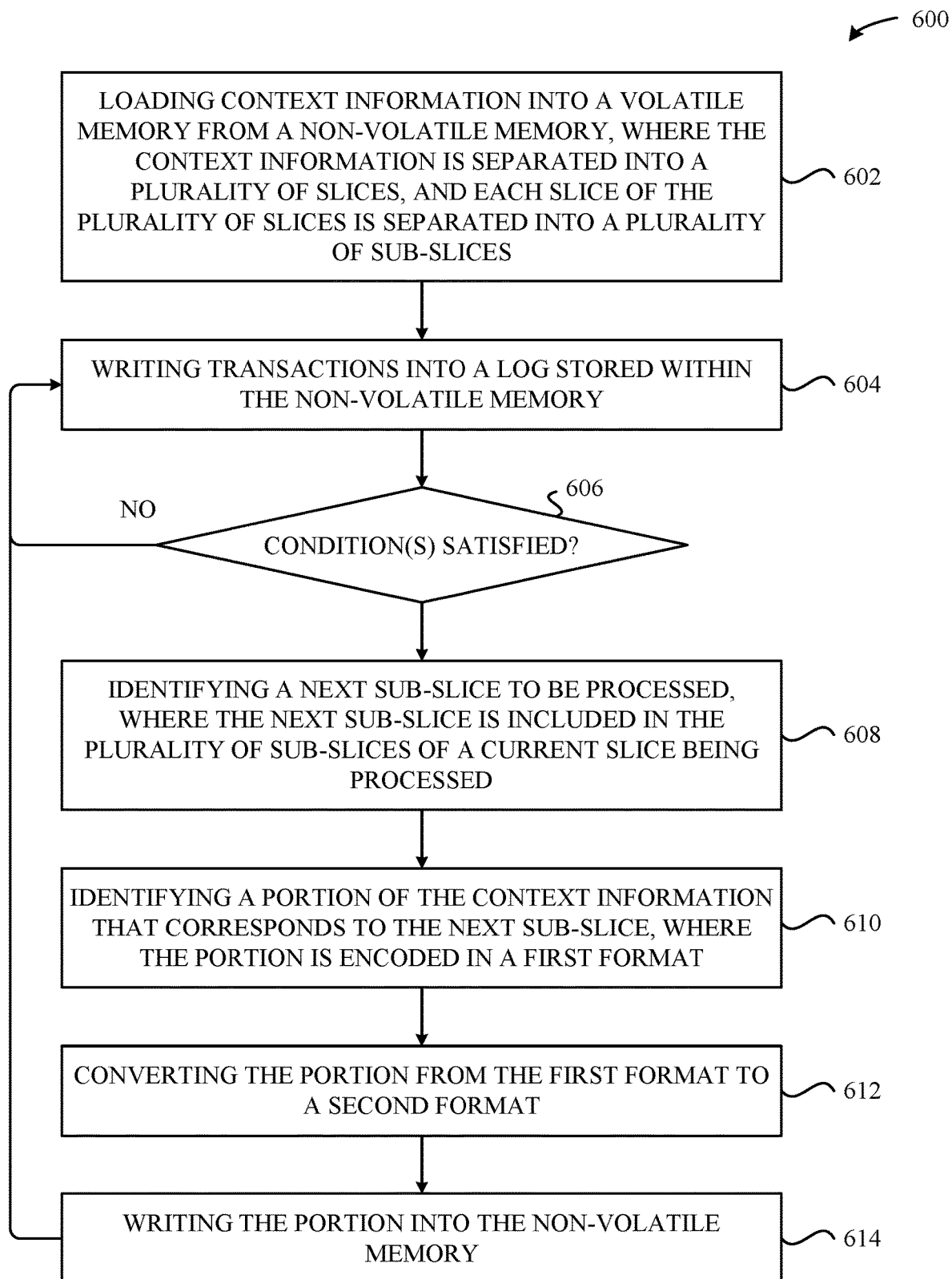
FIG. 6 illustrates a method for managing context information for data stored within a non-volatile memory of a computing device, according to some embodiments.

FIG. 6 illustrates a method 600 for managing context information for data stored within a non-volatile memory of a computing device, according to some embodiments. As shown in FIG. 6, the method 600 begins at step 602, and involves loading context information into a volatile memory (of the computing device) from the non-volatile memory, where the context information is separated into a plurality of slices, and each slice of the plurality of slices is separated into a plurality of sub-slices (e.g., as described above in conjunction with FIGS. 1-2). Step 604 involves writing transactions into a log stored within the non-volatile memory (e.g., as described above in conjunction with FIGS. 5A-5E). Step 606 involves determining whether at least one condition is satisfied (e.g., the conditions described above in conjunction with FIGS. 5A-5E). If, at step 606, it is determined that condition is satisfied, then the method 600 proceeds to step 608. Otherwise, the method 600 proceeds back to step 604, where transactions are received/written into the log (until the at least one condition is satisfied).

Step 608 involves identifying a next sub-slice to be processed, where the next sub-slice is included in the plurality of sub-slices of a current slice being processed (e.g., as described above in conjunction with FIGS. 5A-5E). Step 610 involves identifying a portion of the context information that corresponds to the next sub-slice, where the portion is encoded in a first format (e.g., as described above in conjunction with FIGS. 5A-5E). Step 612 involves converting the portion from the first format to a second format (e.g., as described above in conjunction with FIGS. 5A-5E). Finally, step 614 involves writing the portion into the non-volatile memory. In turn, the method can return to step 604, where additional transactions are processed, and where subsequent slices/sub-slices are processed in a round-robin fashion.

Figure 7:
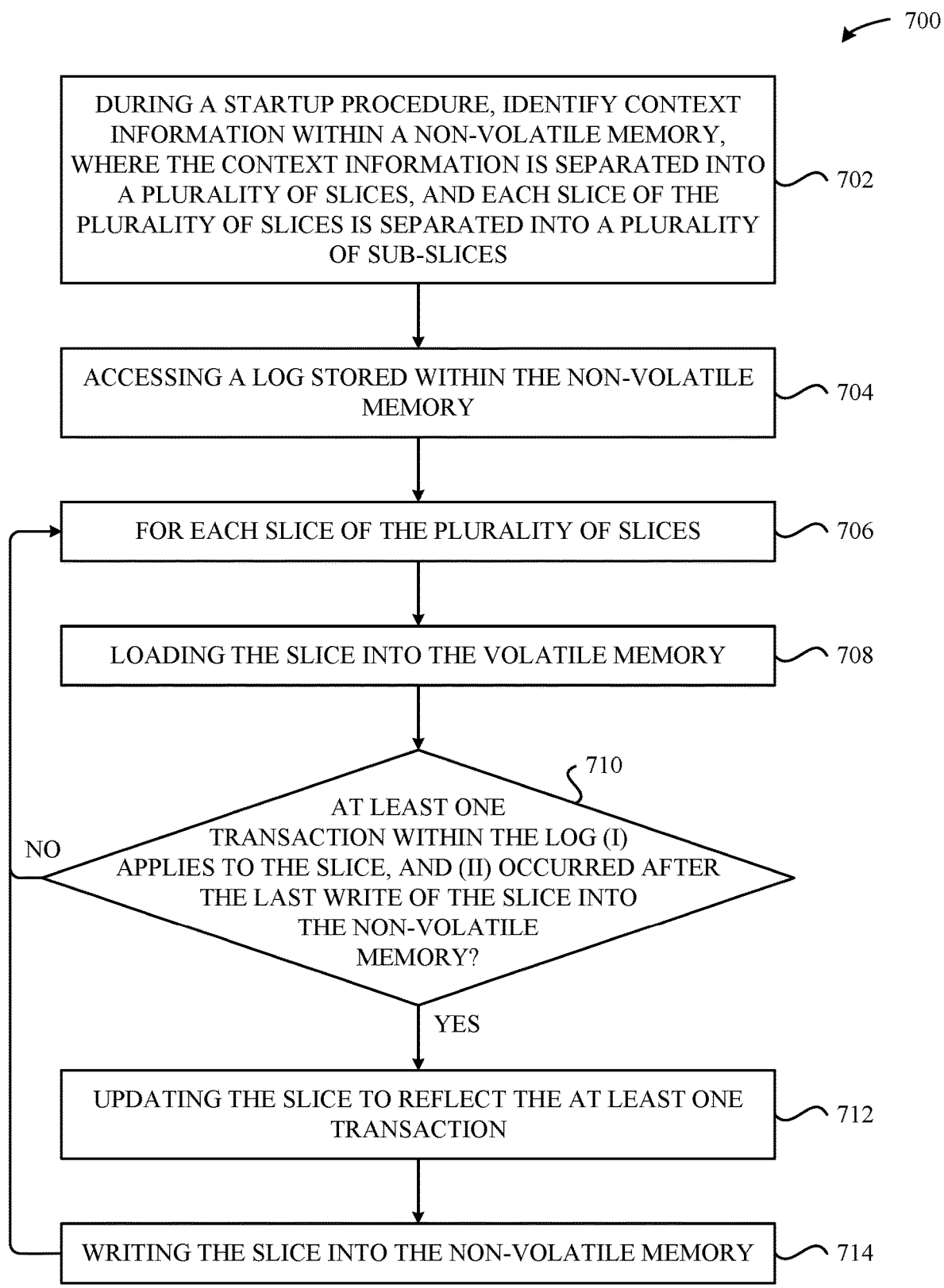
FIG. 7 illustrates a method for restoring context information when an inadvertent shutdown of a computing device occurs, according to some embodiments.

FIG. 7 illustrates a method 700 for restoring context information when an inadvertent shutdown of a computing device occurs, according to some embodiments. As shown in FIG. 7, the method 700 begins at step 702, and involves identifying, during a startup procedure (e.g., a boot, a reboot, a wakeup, etc.), context information within a non-volatile memory, where the context information is separated into a plurality of slices, and each slice of the plurality of slices is separated into a plurality of sub-slices (e.g., as described above in conjunction with FIGS. 1-2). Step 704 involves accessing a log stored within the non-volatile memory (e.g., as described above in conjunction with FIGS. 5F-5H). Step 706 involves carrying out steps 708-714 for each slice of the plurality of slices. In particular, step 708 involves loading the slice into the volatile memory (e.g., as described above in conjunction with FIGS. 5F-5H). In turn, step 710 involves determining whether at least one transaction in the log (i) applies to the slice, and (ii) occurred after a last write of the slice into the non-volatile memory (e.g., as described above in conjunction with FIGS. 5F-5H). If, at step 710, it is determined that at least one transaction in the log (i) applies to the slice, and (ii) occurred after a last write of the slice into the non-volatile memory, then the method 700 proceeds to step 712. Otherwise, the method 700 proceeds back to step 706, which involves processing a next slice (if any) of the plurality of slices, or the method 700 ends. Step 712 involves updating the slice to reflect the at least one transaction (e.g., as described above in conjunction with FIGS. 5F-5H). At step 714, the computing device 102 writes the (updated) slice into the non-volatile memory (e.g., as described above in conjunction with FIGS. 5F-5H). In turn, the method can proceed back to step 706, which involves processing a next slice (if any) of the plurality of slices, or the method 700 can end.

It is noted that this disclosure primarily involves certain components of the computing device 102 carrying out the various techniques described herein for the purpose of unified language and simplification. However, it is noted that other entities can be configured to carry out these techniques without departing from this disclosure. For example, other software components (e.g., the OS 108, applications 110, firmware(s), etc.) executing on the computing device 102 can be configured to carry out all or a portion of the techniques described herein without departing from the scope of this disclosure. Is further noted that these entities can be combined or split into additional entities without departing from the scope of this disclosure. It is additionally noted that the various entities described herein can be implemented using software-based or hardware-based approaches without departing from the scope of this disclosure. Further, all or a portion of the techniques described herein can be offloaded to another computing device without departing from the scope of this disclosure.

Figure 8:
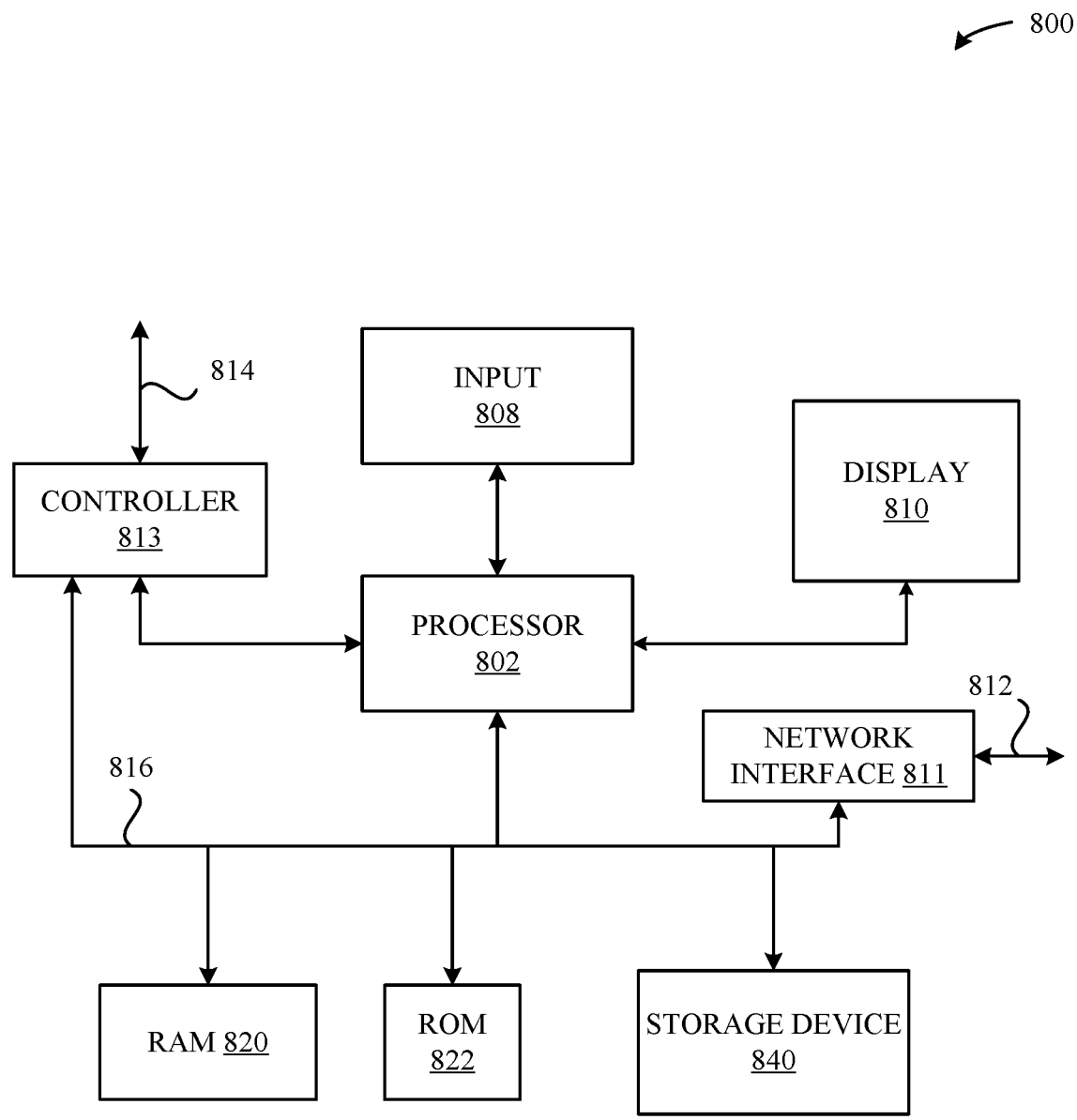
FIG. 8 illustrates a detailed view of a computing device that can be used to implement the various components described herein, according to some embodiments.

FIG. 8 illustrates a detailed view of a computing device 800 that can be used to implement the various components described herein, according to some embodiments. In particular, the detailed view illustrates various components that can be included in the computing device 102 illustrated in FIG. 1. As shown in FIG. 8, the computing device 800 can include a processor 802 that represents a microprocessor or controller for controlling the overall operation of computing device 800. The computing device 800 can also include a user input device 808 that allows a user of the computing device 800 to interact with the computing device 800. For example, the user input device 808 can take a variety of forms, such as a button, keypad, dial, touch screen, audio input interface, visual/image capture input interface, input in the form of sensor data, etc. Still further, the computing device 800 can include a display 810 (screen display) that can be controlled by the processor 802 to display information to the user. A data bus 816 can facilitate data transfer between at least a storage device 840, the processor 802, and a controller 813. The controller 813 can be used to interface with and control different equipment through and equipment control bus 814. The computing device 800 can also include a network/bus interface 811 that couples to a data link 812. In the case of a wireless connection, the network/bus interface 811 can include a wireless transceiver.

The computing device 800 also includes a storage device 840, which can comprise a single disk or a plurality of disks (e.g., SSDs), and includes a storage management module that manages one or more partitions within the storage device 840. In some embodiments, storage device 840 can include flash memory, semiconductor (solid state) memory or the like. The computing device 800 can also include a Random-Access Memory (RAM) 820 and a Read-Only Memory (ROM) 822. The ROM 822 can store programs, utilities or processes to be executed in a non-volatile manner. The RAM 820 can provide volatile data storage, and stores instructions related to the operation of the computing device 102.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

What is claimed is:

1. A method for managing context information for data stored within a non-volatile memory of a computing device, the method comprising, at the computing device:
   loading, into a volatile memory of the computing device, the context information from the non-volatile memory, wherein the context information is separated into a plurality of portions, and each portion of the plurality of portions is separated into a plurality of sub-portions;
   writing transactions into a log stored within the non-volatile memory; and
   each time a condition is satisfied:
      identifying a next sub-portion to be processed, wherein the next sub-portion is included in the plurality of sub-portions of a current portion being processed,
      identifying a portion of the context information that corresponds to the next sub-portion, wherein the portion is encoded in a first format,
      converting the portion from the first format to a second format, and
      writing the portion into the non-volatile memory.

2. The method of claim 1, wherein:
   the portion is written into a corresponding portion of second context information stored in the non-volatile memory, and
   the second context information corresponds to the context information.

3. The method of claim 1, wherein the condition is satisfied when the transactions, if any, that are received subsequent to processing a previous sub-portion relative to the next sub-portion have been processed.

4. The method of claim 1, wherein each sub-portion of the plurality of sub-portions of a given portion of the plurality of portions corresponds to a different, non-successive range of logical base addresses (LBAs) that are referenced by the context information.

5. The method of claim 1, wherein the context information is separated into the plurality of portions, and each portion of the plurality of portions is separated into a plurality of sub-portions in accordance with a quality of service (QoS) metric to be satisfied by the computing device.

6. The method of claim 1, wherein:
   the first format utilizes (1) a plurality of first-tier entries, and (2) a plurality of second-tier entries, and
   for a given portion of the plurality of portions:
      each first-tier entry of the plurality of first-tier entries references (1) an area of memory within the non-volatile memory, or (2) at least one second-tier entry of the plurality of second-tier entries, and
      each second-tier entry of the plurality of second-tier entries references an area of memory within the non-volatile memory.

7. The method of claim 2, further comprising, in response to identifying that all sub-portions of the current portion have been processed:
   writing, to the second context information, metadata information associated with the current portion, and
   writing, to the log stored in the non-volatile memory, an identifier associated with the current portion that indicates that all sub-portions of the current portion have been processed.

8. The method of claim 7, further comprising, in response to identifying that all sub-portions of the current portion have been processed:
  identifying a next portion of the plurality of portions that succeeds the current portion, and
  assigning the next portion as the current portion.

9. At least one non-transitory computer readable storage medium configured to store instructions that, when executed by at least one processor of a computing device, cause the computing device to restore context information when an inadvertent shutdown of the computing device occurs, by carrying out steps that include:
  identifying the context information within a non-volatile memory of the computing device, wherein the context information is separated into a plurality of portions, and each portion of the plurality of portions is separated into a plurality of sub-portions;
  accessing a log stored within the non-volatile memory; and
  for each portion of the plurality of portions:
    loading the plurality of sub-portions of the portion into a volatile memory of the computing device, and
    in response to identifying, within the log, that at least one transaction (i) applies to the portion, and (ii) occurred after a last write of the portion into the non-volatile memory:
      updating the portion to reflect the at least one transaction.

10. The at least one non-transitory computer readable storage medium of claim 9, further comprising, for each portion of the plurality of portions, and subsequent to updating the portion to reflect the at least one transaction:
  writing the portion into the non-volatile memory.

11. The at least one non-transitory computer readable storage medium of claim 9, wherein:
  each portion of the plurality of portions stored in the non-volatile memory is encoded in a first format, and
  each portion of the plurality of portions loaded into the volatile memory is encoded in a second format.

12. The at least one non-transitory computer readable storage medium of claim 11, further comprising, for each portion of the plurality of portions:
  converting the portion from the first format to the second format prior to loading the portion into the volatile memory.

13. A mobile device configured to manage context information for data stored within a non-volatile memory of the mobile device, the mobile device comprising:
  the non-volatile memory;
  at least one processor; and
  a volatile memory storing instructions that, when executed by the at least one processor, cause the mobile device to:
    load, into the volatile memory, the context information from the non-volatile memory, wherein the context information is separated into a plurality of portions, and each portion of the plurality of portions is separated into a plurality of sub-portions;
    write transactions into a log stored within the non-volatile memory; and
    each time a condition is satisfied:
      identify a next sub-portion to be processed, wherein the next sub-portion is included in the plurality of sub-portions of a current portion being processed,
      identify a portion of the context information that corresponds to the next sub-portion, wherein the portion is encoded in a first format,
      convert the portion from the first format to a second format, and
      write the portion into the non-volatile memory.

14. The mobile device of claim 13, wherein:
  the portion is written into a corresponding portion of second context information stored in the non-volatile memory, and
  the second context information corresponds to the context information.

15. The mobile device of claim 13, wherein the condition is satisfied when the transactions, if any, that are received subsequent to processing a previous sub-portion relative to the next sub-portion have been processed.

16. The mobile device of claim 13, wherein each sub-portion of the plurality of sub-portions of a given portion of the plurality of portions corresponds to a different, non-successive range of logical base addresses (LBAs) that are referenced by the context information.

17. The mobile device of claim 13, wherein the context information is separated into the plurality of portions, and each portion of the plurality of portions is separated into a plurality of sub-portions in accordance with a quality of service (QoS) metric to be satisfied by the computing device.

18. The mobile device of claim 13, wherein:
  the first format utilizes (1) a plurality of first-tier entries, and (2) a plurality of second-tier entries, and
  for a given portion of the plurality of portions:
    each first-tier entry of the plurality of first-tier entries references (1) an area of memory within the non-volatile memory, or (2) at least one second-tier entry of the plurality of second-tier entries, and
    each second-tier entry of the plurality of second-tier entries references an area of memory within the non-volatile memory.

19. The mobile device of claim 14, wherein the at least one processor further causes the mobile device to, in response to identifying that all sub-portions of the current portion have been processed:
  write, to the second context information, metadata information associated with the current portion, and
  write, to the log stored in the non-volatile memory, an identifier associated with the current portion that indicates that all sub-portions of the current portion have been processed.

20. The mobile device of claim 19, wherein the at least one processor further causes the mobile device to, in response to identifying that all sub-portions of the current portion have been processed:
  identify a next portion of the plurality of portions that succeeds the current portion, and
  assign the next portion as the current portion.

* * * * *